(12) United States Patent
Kim et al.

(10) Patent No.: US 10,289,274 B2
(45) Date of Patent: May 14, 2019

(54) VEHICLE DRIVER ASSISTANCE APPARATUS AND VEHICLE DRIVER ASSISTANCE METHOD THEREFOR

(71) Applicant: LG ELECTRONICS INC., Seoul (KR)

(72) Inventors: Soyoung Kim, Seoul (KR); Hyunsun Lyu, Seoul (KR); Jiyeong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 15/312,496

(22) PCT Filed: Dec. 30, 2015

(86) PCT No.: PCT/KR2015/014452
§ 371 (c)(1),
(2) Date: Nov. 18, 2016

(87) PCT Pub. No.: WO2017/104888
PCT Pub. Date: Jun. 22, 2017

(65) Prior Publication Data
US 2018/0032217 A1    Feb. 1, 2018

(30) Foreign Application Priority Data

Dec. 16, 2015 (KR) .......................... 10-2015-0180520

(51) Int. Cl.
*G06F 3/0482*    (2013.01)
*B60R 1/00*    (2006.01)
(Continued)

(52) U.S. Cl.
CPC ............ *G06F 3/0482* (2013.01); *B60K 35/00* (2013.01); *B60K 37/06* (2013.01); *B60R 1/00* (2013.01);
(Continued)

(58) Field of Classification Search
CPC .... G06F 3/0482; B60R 1/00; B60R 2300/107
See application file for complete search history.

(56) References Cited

U.S. PATENT DOCUMENTS 7,254,709 B1 *  8/2007  Richard ................. G06Q 10/10
                                                713/168
7,315,943 B2 *  1/2008  Shibata ................. H04L 63/045
                                                713/155
(Continued)

FOREIGN PATENT DOCUMENTS

JP  2005-297955 A  10/2005
JP  2007-80060 A   3/2007
(Continued)

*Primary Examiner* — Daeho D Song
(74) *Attorney, Agent, or Firm* — Birch, Stewart, Kolasch & Birch, LLP

(57) ABSTRACT

A vehicle driver assistance apparatus in a vehicle, the apparatus including a display; a vehicle information acquisition unit configured to acquire vehicle information of another vehicle which is driving or standing in a vicinity thereof; a wireless communication unit configured to wirelessly communicate with the other vehicle; and a processor configured to display information on the display corresponding to at least one service related to the acquired vehicle information, the at least one service being authorized by the other vehicle to be accessed by the vehicle, and execute the at least one service in response to a selection of the information on the display.

15 Claims, 20 Drawing Sheets

(51) Int. Cl.
*B60W 50/10* (2012.01)
*B60W 50/14* (2012.01)
*B60W 40/10* (2012.01)
*B60K 35/00* (2006.01)
*B60K 37/06* (2006.01)
*H04W 76/10* (2018.01)
*B60R 1/12* (2006.01)
*G06F 3/0488* (2013.01)
*G06K 9/00* (2006.01)
*H04N 5/232* (2006.01)

(52) U.S. Cl.
CPC ............ *B60W 40/10* (2013.01); *B60W 50/10* (2013.01); *B60W 50/14* (2013.01); *B60K 2350/1028* (2013.01); *B60K 2350/1084* (2013.01); *B60K 2350/2013* (2013.01); *B60K 2350/357* (2013.01); *B60R 1/12* (2013.01); *B60R 2001/1253* (2013.01); *B60R 2300/107* (2013.01); *B60R 2300/30* (2013.01); *G06F 3/0488* (2013.01); *G06K 9/00791* (2013.01); *G06K 2209/15* (2013.01); *H04N 5/23293* (2013.01); *H04W 76/10* (2018.02)

(56) References Cited

U.S. PATENT DOCUMENTS

| | | | | |
|---|---|---|---|---|
| 8,463,642 | B2* | 6/2013 | Hedley | G06Q 30/0283 705/13 |
| 8,494,498 | B2* | 7/2013 | Kwon | G06Q 30/0241 382/190 |
| 8,971,582 | B2* | 3/2015 | DeHart | G08G 1/127 382/105 |
| 9,779,311 | B2* | 10/2017 | Lee | G08G 1/017 |
| 9,809,158 | B2* | 11/2017 | Geller | B60Q 1/50 |
| 2004/0003229 | A1* | 1/2004 | Reinold | B60R 16/0234 713/155 |
| 2005/0084134 | A1* | 4/2005 | Toda | G08G 1/017 382/105 |
| 2006/0294392 | A1* | 12/2006 | Veprek | G06F 21/31 713/183 |
| 2007/0022375 | A1* | 1/2007 | Walker | G06Q 30/02 715/210 |
| 2007/0069921 | A1* | 3/2007 | Sefton | G08G 1/0175 340/932.2 |
| 2007/0162550 | A1* | 7/2007 | Rosenberg | H04L 51/04 709/206 |
| 2009/0098882 | A1* | 4/2009 | Yoon | H04M 1/72572 455/456.1 |
| 2011/0009098 | A1* | 1/2011 | Kong | G06Q 10/02 455/414.1 |
| 2011/0057816 | A1* | 3/2011 | Noble | G06K 9/325 340/937 |
| 2011/0244881 | A1* | 10/2011 | Bando | G01S 5/0072 455/456.1 |
| 2012/0222130 | A1* | 8/2012 | Lee | G07C 5/085 726/27 |
| 2014/0036076 | A1* | 2/2014 | Nerayoff | H04N 7/181 348/148 |
| 2015/0099545 | A1* | 4/2015 | Hyun | H04W 4/02 455/456.3 |
| 2015/0113012 | A1* | 4/2015 | Silver | H04L 51/38 707/758 |
| 2015/0193662 | A1 | 7/2015 | Yoo et al. | |
| 2015/0312353 | A1* | 10/2015 | Chen | H04W 4/046 709/228 |
| 2015/0339927 | A1* | 11/2015 | Han | B60W 40/10 701/301 |
| 2016/0072815 | A1* | 3/2016 | Rieke | H04L 63/1433 726/3 |
| 2016/0272117 | A1* | 9/2016 | Kang | B60R 1/00 |
| 2016/0364812 | A1* | 12/2016 | Cao | G06Q 50/01 |

FOREIGN PATENT DOCUMENTS

| | | |
|---|---|---|
| JP | 2014-35582 A | 2/2014 |
| KR | 10-2006-0061680 A | 6/2006 |
| KR | 10-2013-0083087 A | 7/2013 |
| KR | 10-1512809 B1 | 4/2015 |
| KR | 10-2015-0081838 A | 7/2015 |

* cited by examiner

VEHICLE DRIVER ASSISTANCE APPARATUS AND VEHICLE DRIVER ASSISTANCE METHOD THEREFOR

CROSS REFERENCE TO THE RELATED APPLICATIONS

This application is the National Phase of PCT International Application No. PCT/KR2015/014452, filed on Dec. 30, 2015, which claims priority under 35 U.S.C. 119(a) to Patent Application No. 10-2015-0180520, filed in Korea on Dec. 16, 2015, all of which are hereby expressly incorporated by reference into the present application.

BACKGROUND OF THE INVENTION

Field of the Invention

The present invention relates to a vehicle driver assistance apparatus, and in particular, to a vehicle driver assistance apparatus capable of providing various related services by using a vehicle number and a vehicle driver assistance method therefor.

Description of the Related Art

A vehicle is an apparatus that moves a user in a direction in which he or she wants to go. A representative example of the vehicle may be a car.

In addition, the vehicle has been provided with various types of sensors and devices for convenience of a user using the vehicle. In particular, various devices have been developed for the driving convenience of the user.

On the other hand, a driver which drives the above-described vehicle may attempt to make a call with a driver of a counterpart vehicle depending on driving environments in various environments.

However, the call connection is generally made through a contact recorded in the counterpart vehicle. In a situation where it is hard to check the contact (for example, during driving, or when the contact is not recorded), the call connection is not effectively performed.

SUMMARY OF THE INVENTION

Embodiments of the present invention provide a vehicle driver assistance apparatus and a vehicle driver assistance method therefor, which acquire a vehicle number and provide various services related to a vehicle number by using the acquired vehicle number.

The problems of the present application to be solved are not limited to the aforementioned technical problems, and other technical problems, which are not mentioned, may be obviously understood by a person with ordinary skill in the art from the following description.

In one embodiment, provided is a vehicle driver assistance apparatus according to an embodiment including: a vehicle information acquisition unit configured to acquire vehicle information; a processor configured to, when the vehicle information is acquired, receive a service related to the acquired vehicle information and display information corresponding to the received service; and a display unit configured to display the information corresponding to the service related to the vehicle information.

In another embodiment, provided is a vehicle driver assistance method according to an embodiment including: acquiring a vehicle number of a vehicle which is driving or standing in vicinity thereof; displaying a list of services related to the acquired vehicle number; and when one service is selected from the list of services, displaying information corresponding to the selected service.

According to the embodiments of the present invention, it is possible to achieve optimized information sharing in various driving environments by providing the vehicle number-related services by using the vehicle number.

Also, according to the embodiment of the present invention, it is possible to remove a need for the driver to directly check a contact of a driver of a counterpart vehicle, minimizing possibility of accidents which may occur during driving, and therefore, increasing satisfaction of the user.

DETAILED DESCRIPTION OF THE EMBODIMENTS

Figure 1:
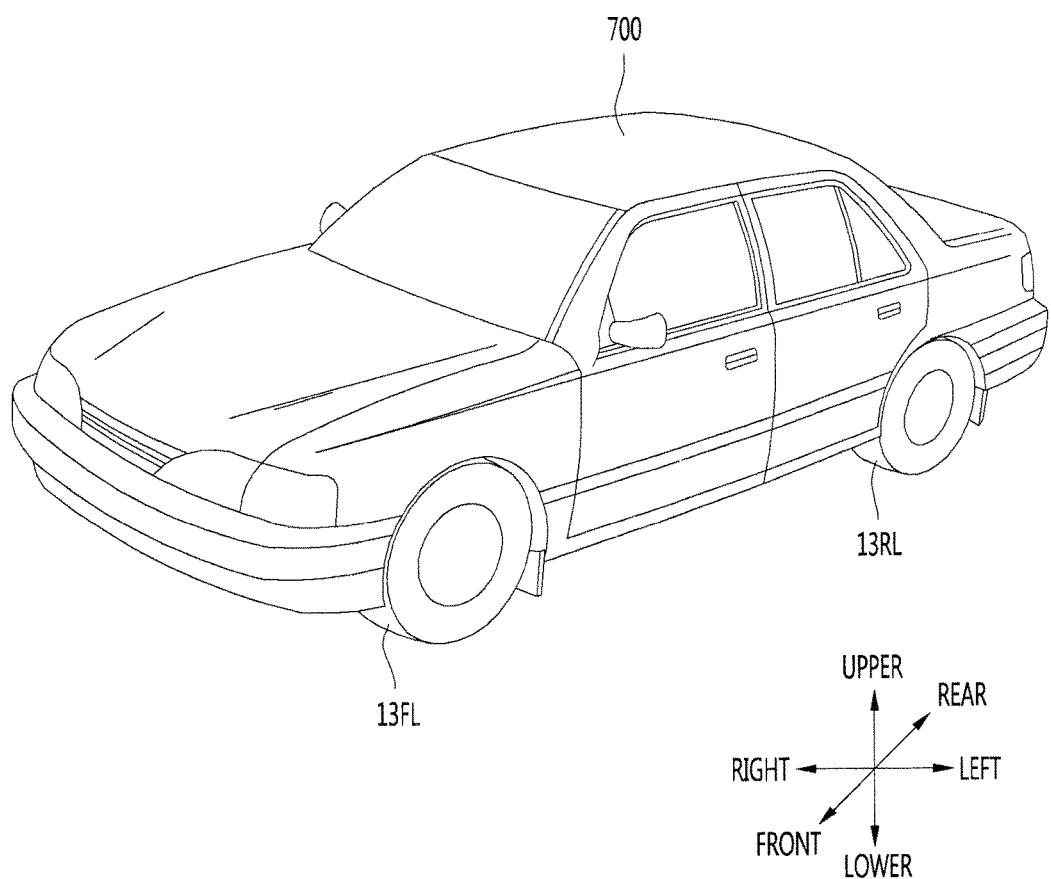
FIG. 1 is a diagram illustrating an appearance of a vehicle including a vehicle driver assistance apparatus according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are used only in consideration of ease in preparation of the specification, and do not have distinct meanings. Accordingly, the suffixes "module" and "unit" may be used interchangeably. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and sprit of the present invention.

It will be understood that although the terms first, second, etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise.

In the present application, it will be further understood that the terms "comprises", "includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include a car and a motorcycle. Hereinafter, a car will be focused upon.

A vehicle as described in this specification may include all of an internal combustion engine vehicle including an engine as a power source, a hybrid vehicle including both an engine and an electric motor as a power source, and an electric vehicle including an electric motor as a power source.

In the following description, the left of a vehicle means the left of the vehicle in the direction of travel and the right of the vehicle means the right of the vehicle in the direction of travel.

In the following description, a left hand drive (LHD) vehicle will be focused upon unless otherwise stated.

Figure 2:
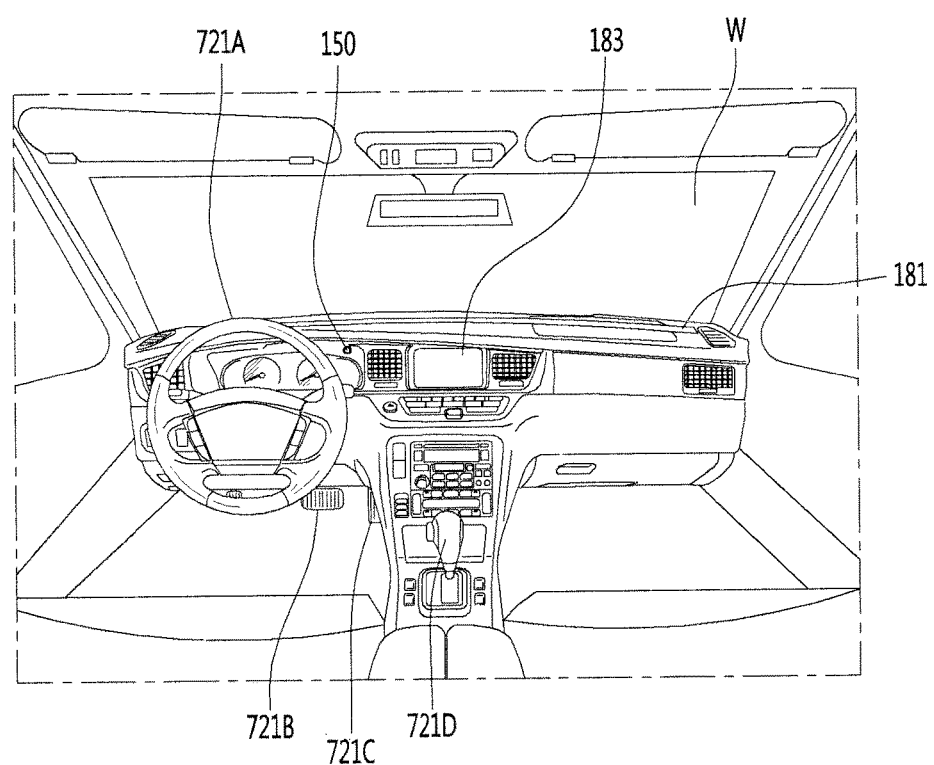
FIG. 2 is a diagram illustrating the inside of a vehicle including a vehicle driver assistance apparatus according to an embodiment of the present invention.
Figure 3:
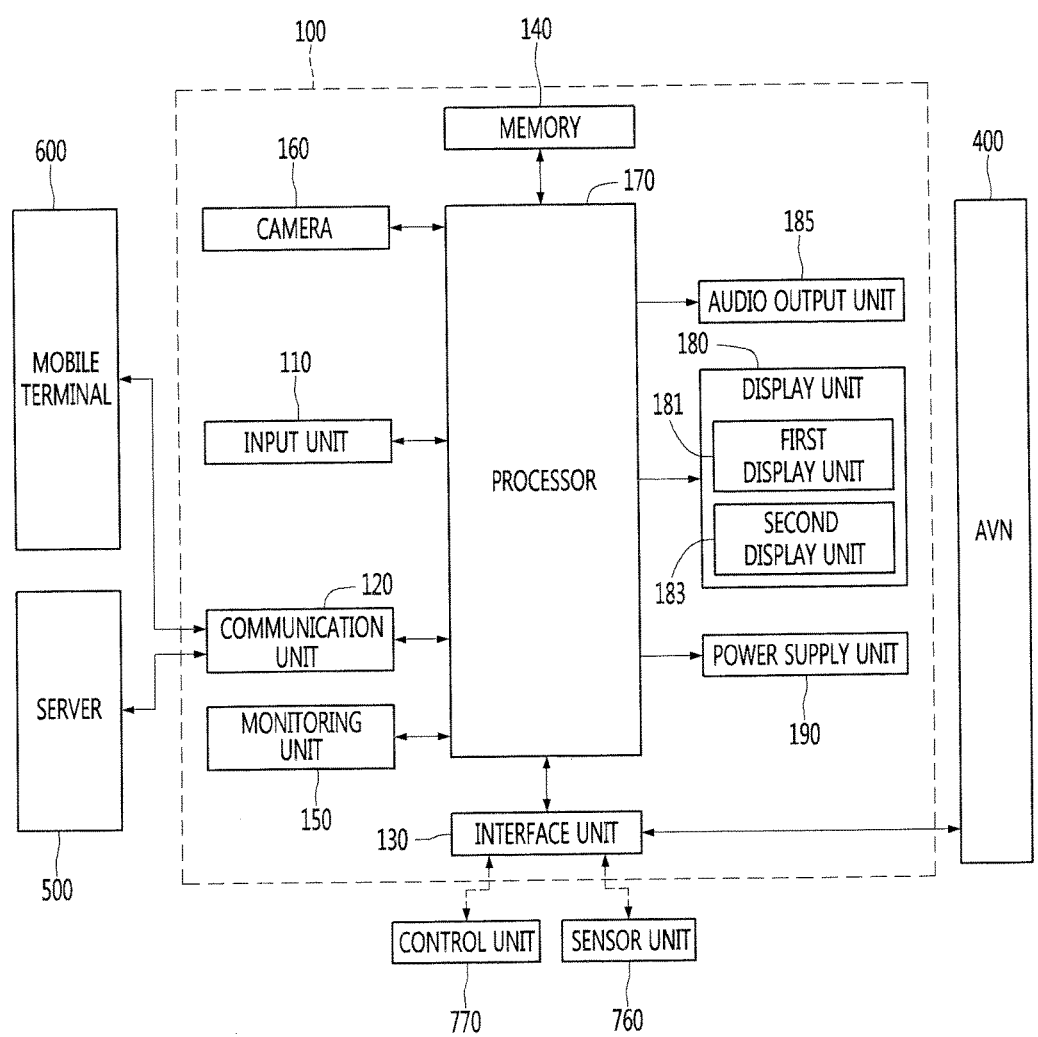
FIG. 3 is a block diagram of a vehicle driver assistance apparatus according to an embodiment of the present invention.

FIG. 1 is a diagram illustrating an appearance of a vehicle including a vehicle driver assistance apparatus according to an embodiment of the present invention, FIG. 2 is a diagram illustrating the inside of a vehicle including a vehicle driver assistance apparatus according to an embodiment of the present invention, and FIG. 3 is a block diagram of a vehicle driver assistance apparatus according to an embodiment of the present invention.

Referring to FIGS. 1 to 3, a vehicle 700 may include wheels 13FL and 13FR rotated by a power source, driving manipulation units 721A, 721B, 721C, and 721D for controlling driving of the vehicle 700 and a vehicle driver assistance apparatus 100.

The vehicle 700 described in the present specification is capable of providing advanced driver assistance systems (ADAS). For example, the vehicle 700 may provide a blind spot detection (BSD) function, a Lane Keeping Assist System (LKAS) function, a Lane Departure Warning System (LDWS) function, and an Autonomous Emergency Braking (AEB) function, and the like.

The advanced driver assistance systems may be executed by the vehicle driver assistance apparatus 100, by the vehicle, or a separately-provided apparatus.

The present embodiment is described in which the vehicle driver assistance apparatus 100 recognizes a peripheral vehicle, acquires a vehicle number, and provides vehicle number-related services by using the acquired vehicle number, but is not limited thereto.

Although the vehicle driver assistance apparatus 100 is described as directly including the units illustrated in FIG. 3 in the present embodiment, it is possible to use and execute the units of the vehicle 700 through an interface unit 130. In addition, it is understood that the vehicle driver assistance apparatus 100 is the collection of the units.

Specifically, referring to FIG. 3, the vehicle driver assistance apparatus 100 may include an input unit 110, a communication unit 120, the interface unit 130, a memory 140, a monitoring unit 150, a camera 160, a processor 170, a display unit 180, an audio output unit 185, and a power supply unit 190.

The vehicle driver assistance apparatus 100 may include the input unit 110 that detects a user input. A user can turn on/off functions of the vehicle driver assistance apparatus or make an input to power on/off the vehicle driver assistance apparatus 100, through the input unit 110.

The input unit 110 may include at least one of a gesture input unit 110 for detecting a user gesture, a touch input unit 110 for detecting a touch, and a microphone for detecting a voice input to detect the user input.

In this case, the touch input unit 110 included in the input unit 110 detects a touch on a specific portion of a display screen and generates a control command assigned to the specific portion. Also, the touch input unit 110 may allow selection of one of various services related to a specific vehicle number according to a touch signal by the user.

In other words, the processor 170 may output a control signal for controlling a specific element of the vehicle 700 based on the user input received through the input unit 110.

Next, the vehicle driver assistance apparatus 100 may include a communication unit 120 that communicates with another vehicle 510, a terminal 600, a server 500, etc. The vehicle driver assistance apparatus may receive, through the communication unit 120, navigation information or/and traffic information.

Also, the communication unit 120 may store vehicle information including the acquired vehicle number in the server 500 through communication with the server 500. The communication unit 120 may receive information on a specific destination from the server 500 and transmit the vehicle information including the vehicle number to the specific destination.

In this case, the specific destination may be a public institution that cracks down illegality of a vehicle (for example, a police station), or a mobile terminal of a specific user which is pre-registered corresponding to the vehicle number.

Specifically, the communication unit 120 may exchange data with the mobile terminal 600, the server 500, or a specific related institution in a wireless manner. In particular, the communication unit 120 may exchange data with the mobile terminal 600 of a driver of the vehicle 700 in a wireless manner. Wireless data communication methods may include various data communication methods, such as Bluetooth, WiFi, Direct WiFi, APiX, and near field communication (NFC).

Also, the communication unit 120 may receive position information, weather information, and road traffic information, for example, transport protocol expert group (TPEG) information, from the mobile terminal 600 or the server 500.

Also, when the mobile terminal 600 is used as a navigation device, the communication unit 120 may also receive navigation information from the mobile terminal 600. Here, the navigation information may include at least one of map information relating to driving of the vehicle 700, position information of the vehicle 700, preset destination information, and route information to a destination.

Also, when a user gets in the vehicle 700, the mobile terminal 600 of the user and vehicle driver assistance apparatus 100 may also perform pairing automatically or by the execution of an application by the user.

The communication unit 120 may transmit an operation history of the advanced driver assistance systems to the mobile terminal 600 through the pairing, thereby providing the operation history to the user.

Therefore; the communication unit 120 may perform wireless communication by using wireless data communication. The wireless data communication may use technical standards or communication techniques for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A)).

Also, the communication unit 120 may use a wireless internet technology, which may include e.g., wireless LAN (WLAN), Wi-Fi, Wi-Fi Direct, digital living network alliance (DLNA), wireless broadband (WiBro), world interoperability for microwave access (WiMAX), HSDPA, HSUPA, LTE, LTE-A, etc.

Also, the communication unit 120 may use short-range communication and may support short-range communication by using at least one of e.g., Bluetooth™, radio frequency identification (RFID), infrared data association (IrDA), ultra-wideband (UWB), ZigBee, near field communication (NFC), Wi-Fi, Wi-Fi Direct, and wireless universal serial bus (wireless USB) technologies.

Next, the vehicle driver assistance apparatus 100 may include the interface unit 130 that receives data associated with the vehicle 700 or transmits a signal processed or generated by the processor 170 to the outside.

The interface unit 130 may perform data communication with a control unit 770, an audio video navigation (AVN) device 400, a sensing unit 760, or the like within the vehicle in a wired or wireless communication manner.

The interface unit 130 may receive navigation information through data communication with the control unit 770, the AVN device 400, and/or a separate navigation device.

Also, the interface unit 130 may receive sensor information from the control unit 770 or the sensing unit 760.

Here, the sensor information may include at least one of direction information, position information, vehicle speed information, acceleration information, tilt information, forward/backward movement information, and fuel information of the vehicle 700, information on the distance between the vehicle 700 and vehicles ahead and behind, information on the distance between the vehicle 700 and a lane, and turn signal information.

Also, the sensor information may be acquired from a heading sensor, a yaw sensor, a gyro sensor, a position module, a vehicle forward/backward movement sensor, a wheel sensor, a vehicle speed sensor, a vehicle-body tilt sensor, a battery sensor, a fuel sensor, a tire sensor, a steering sensor by the rotation of a steering wheel, a vehicle internal temperature sensor, a vehicle internal humidity sensor, etc. The position module may include a GPS module for GPS information reception.

The interface unit 130 may receive a user input received through the user input unit 110 of the vehicle 700. The interface unit 130 may receive the user input from the input unit 720 of the vehicle 700 or through the control unit 770. That is, in the case where the input unit 110 is disposed as an element within the vehicle 700, it is possible to receive the user input through the interface unit 130.

The interface unit 130 may also receive traffic information acquired from the server 500. The server 500 may be a server that is located at a traffic control center that controls traffic. For example, in the case where the traffic information is received from the server 500 through the communication unit 120 of the vehicle 700, the interface unit 130 may also receive the traffic information from the control unit 770.

Next, the memory 140 may store various pieces of data for the overall operation of the vehicle driver assistance apparatus 100, such as programs for processing or controlling the processor 170. Also, the memory 140 may further store pre-registered user information, information on a driving pattern of the driver, and the like.

In this case, a history of the driving pattern may include at least one of a direction history, a position history, a vehicle speed history, an acceleration history, a tilt history, a forward/backward movement history, and a fuel history, which are related to a driver who drives the vehicle 700 under ordinary conditions, a history of the distance between the vehicle 700 and a vehicle ahead or behind, a history of the distance between the vehicle 700 and a lane, and a turn signal history.

The memory 140 may include, as hardware, at least one of various types of storage mediums, including a flash memory type memory, a hard disk type memory, a solid state disk (SSD) type memory, a silicon disk drive (SDD) type memory, a multimedia card micro type memory, a card type memory (e.g., an SD or XD memory), a random access memory (RAM), an static random access memory (SRAM), a read-only memory (ROM), an electrically erasable programmable read-only memory (EEPROM), a programmable read-only memory (PROM), a magnetic memory, a magnetic disk, and an optical disk.

Also, the vehicle driver assistance apparatus 100 may also operate in conjunction with a web storage that performs the storage function of the memory 140 on Internet.

The vehicle driver assistance apparatus 100 may include a monitoring unit 150 that captures an image inside of the vehicle 700.

Specifically, the monitoring unit 150 may detect and acquire the user's biometric information. The acquired biometric information may be used as authentication information for performing user authentication.

The biometric information may include image information acquired by capturing an image of the user, fingerprint information, iris-scan information, retina-scan information, hand geometry information, facial recognition information, and voice recognition information. That is, the monitoring unit 150 may include a sensor for sensing the user's biometric information.

Also, the monitoring unit 150 may acquire an image of the user for biometrics. That is, the monitoring unit 150 may be an image acquisition module that is disposed inside the vehicle 700.

In addition, it is possible to detect the user's gaze by analyzing an image acquired through the monitoring unit 150. Furthermore, the processor 170 may control display unit 180 to display a projected image on a windshield W according to the detected gaze.

Next, the vehicle driver assistance apparatus 100 may include a camera 160 that captures an image of the surroundings of the vehicle 700. The image of the surroundings of the vehicle 700 captured by the camera 160 may be included in an image related to the advanced driver assistance systems.

The vehicle driver assistance apparatus 100 may further include a sensor unit that detects an object around the vehicle.

As described above, the vehicle driver assistance apparatus 100 may separately include the sensor unit, and detect an object around the vehicle and receive the sensor information obtained by a sensing unit 760 of the vehicle 700 itself, through the interface unit 130.

The sensor unit may include a distance sensor 191 that detects a position of the object.

The distance sensor 191 may accurately detect the direction and distance of the object from the present vehicle 700 and a direction in which the object moves. Also, the distance sensor 191 may continuously measure a positional relationship with the detected object to accurately detect a variation in positional relationship.

The distance sensor 191 may detect objects disposed on the front, back, left, and right sides of the vehicle 700. To this end, the distance sensor 191 may be disposed at various positions of the vehicle 700.

Figure 4:
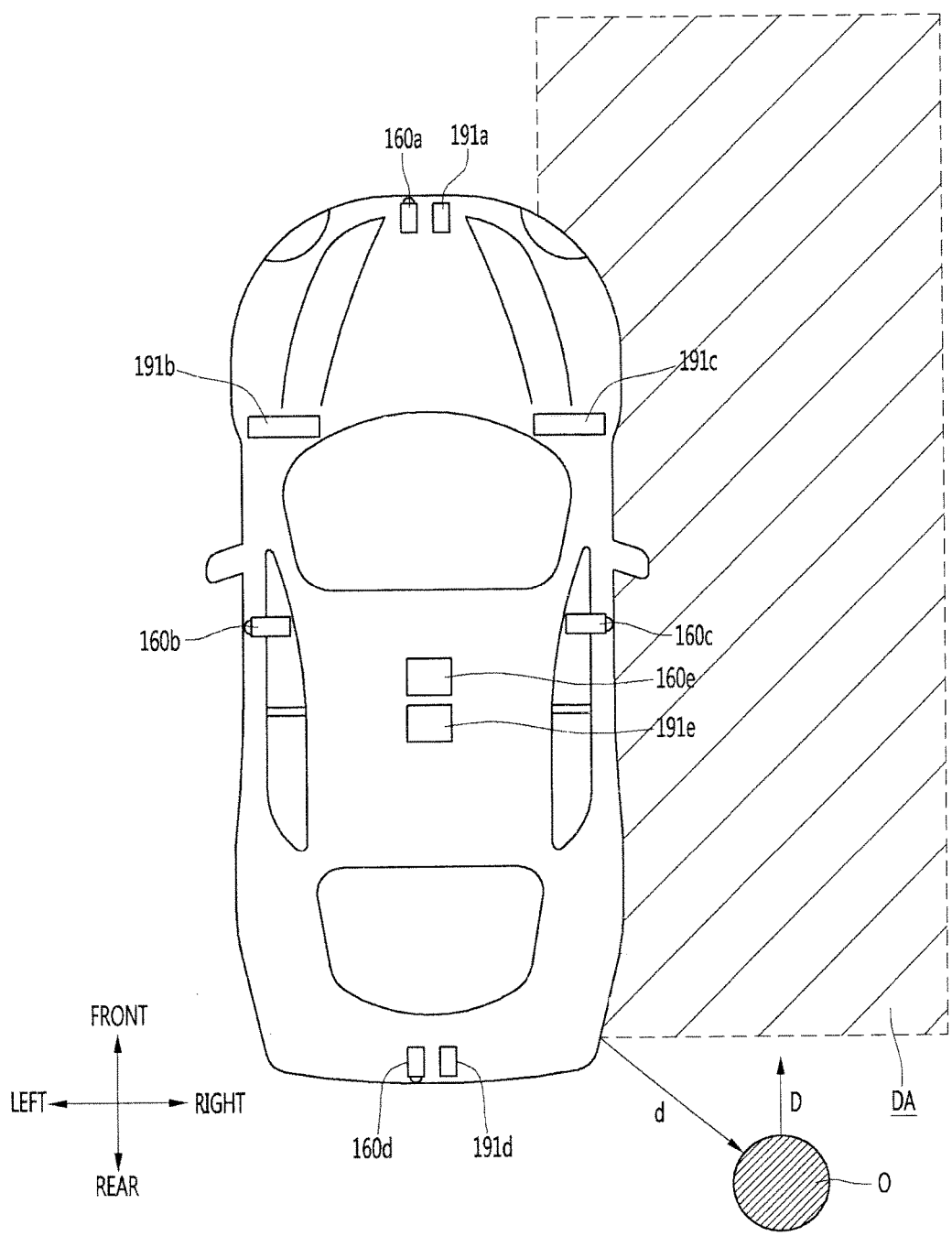
FIG. 4 is a plan view of a vehicle including a sensor unit according to an embodiment of the present invention.

FIG. 4 is a plan view of a vehicle including a sensor unit according to an embodiment of the present invention.

Specifically, referring to FIG. 4, the distance sensor 191 may be disposed on at least one of the front, back, left, and right sides 191a, 191b, 191c, and 191d of the vehicle 700 and the ceiling 191e of the body of the vehicle 700.

The distance sensor 191 may include various distance measurement sensors, such as a lidar sensor, a laser sensor, an ultrasonic sensor, a stereo camera, or the like.

For example, the distance sensor may be a laser sensor and measure a positional relationship between the vehicle 700 and the object by using time-of-flight (TOF) and/or phase shift according to a laser signal modulation method. Specifically, the TOF may measure the distance and direction to the object by emitting a pulse laser signal and measuring a time when reflected pulse signals from the objects within a measurement range reach a receiver.

On the other hand, an attribute of the object for determining a subject for a related service may be acquired in such a way that the processor 170 analyzes the image captured by the camera 160.

To this end, the sensor unit may include the camera 160.

Specifically, the vehicle driver assistance apparatus 100 may include the camera 160 that captures an image of the surroundings of the vehicle. In addition, the processor 170 may detect an object around the vehicle, detect the attribute of the object and generate image information, based on the acquired image of the surroundings of the vehicle.

Here, the image information is at least one of pieces of information, such as a type of the object, traffic signal information that the object shows, the distance between the object and the vehicle, and the position of the object, and may be included in sensor information.

Also, when the type of the object is a vehicle, the image information may include a vehicle number included in the object in order to provide a related service.

Specifically, the processor 170 may perform object analysis in such a way to detect an image from the captured image through image processing, track the object, measure the distance to the object, and the like, and generate image information.

In order for the processor 170 to more easily perform the object analysis, the camera 160 may be a stereo camera that captures an image and measures the distance to the object in the captured image. Embodiments of the present invention are not limited thereto.

The camera 160 may include an internal camera that captures an image of a front view of the vehicle 700 inside the vehicle to acquire a front view image.

Such a camera 160 may be disposed at various positions of the external portion of the vehicle.

Referring to FIG. 4, a plurality of cameras 160 may be disposed in at least one of the left, rear, right, front, and ceiling of the vehicle 700.

A left camera 160b may be disposed in a casing that surrounds a left side mirror. Alternatively, the left camera 160b may be disposed outside the casing that surrounds the left side mirror. Alternatively, the left camera 160b may be disposed in an area outside a left front door, a left rear door or left fender.

The right camera 160c may be disposed in a casing that surrounds a right side mirror. Alternatively, the right camera 160c may be disposed outside the casing that surrounds the right side mirror. Alternatively, the right camera 160c may be disposed in an area outside a right front door, a right rear door or right fender.

Also, a rear camera 160d may be disposed near a rear number plate or trunk switch. A front camera 160a may be disposed near an emblem or radiator grill.

The processor 170 may synthesize images captured in all directions to provide an around view image from a top view of the vehicle 700. When the around view image is generated, boundaries are generated among image areas. These boundaries may be naturally displayed by image blending.

Also, a ceiling camera 160e may be disposed on the ceiling of the vehicle 700 to capture images of the front, rear, left and right of the vehicle 700.

Such a camera 160 may also include an image sensor and an image processing module. The camera 160 may process a still image or video that is obtained by the image sensor (e.g., CMOS or CCD). Also, the image processing module may process the still image or video obtained by the image sensor to extract necessary image information, and deliver the extracted image information to the processor 170.

In an embodiment, the sensor unit may include a stereo camera including the distance sensor 191 and the camera 160. That is, the stereo camera may obtain an image and detect a position of an object.

The camera 160 acquires vehicle information on a specific vehicle (particularly, vehicle number) in connection with which it is intended to use related services, and transfers the acquired vehicle information to the processor 170.

Next, the vehicle driver assistance apparatus 100 may further include a display unit 180 that displays information on related services.

Specifically, the display unit 180 may display acquired information on peripheral vehicles, information on services related to the peripheral vehicles, or detailed information on any one specific service of the related services.

Such a display unit 180 may include a plurality of displays.

Specifically, the display unit 180 may include a first display unit 181 that displays an image by projecting the image onto the windshield W of the vehicle 700. That is, the first display unit 181 may be a head up display (HUD) and include a projection module that projects an image onto the windshield W. A projected image generated by the projection module has a predetermined transparency, allowing the user to see the projected image and an image or object behind the projected image simultaneously.

The projected image displayed on the first display unit 181 is superimposed on a transparent image projected onto the windshield W to provide augmented reality. In this case, the projected image representing, for example, a result of acquisition of vehicle information, which is displayed to the user, is aligned with the transparent image, intuitively providing description on the advanced driver assistance systems to the user.

Also, the display unit 180 may display driver assistance information including a distance to a lane, a distance to a peripheral vehicle, and the like.

The display unit 180 may aid in safe driving of the user, enhancing driving safety.

The display unit 180 may include a second display unit 183 separately disposed inside the vehicle 700 to display an image.

Specifically, the second display unit 183 may be a display of a vehicle navigation device or a front cluster inside the vehicle.

Also, the second display unit 183 may include at least one of a liquid crystal display (LCD), a thin film transistor-liquid crystal display (TFT LCD), an organic light-emitting diode (OLED), a flexible display, a 3D display, and an e-ink display.

Such a second display unit 183 may be combined with a gesture input unit 110 to form a touch screen.

Also, the vehicle driver assistance apparatus 100 may further include an audio output unit 185 and a power supply unit 190.

Specifically, the audio output unit 185 may output messages for various environments which may occur during vehicle driving, through sound. The vehicle driver assistance apparatus 100 may more efficiently provide the related services through sound of the audio output unit 185, in addition to visual display through the display unit 180.

Lastly, the vehicle driver assistance apparatus 100 may include the processor 170 that controls the overall operations of the units of the vehicle driver assistance apparatus 100.

The processor 170 may be implemented by using at least one of an application specific integrated circuit (ASIC), a digital signal processor (DSP), a digital signal processing device (DSPD), a programmable logic device (PLD), a field programmable gate array (FPGA), a controller, a microcontroller, a microprocessor, and electrical units for executing other functions.

In addition, the processor 170 may be controlled by a control unit or may control various functions of the vehicle 700 through the control unit.

In particular, when specific vehicle information is acquired through the camera 160 or the input unit 110, the processor 170 may display the acquired vehicle information.

When a plurality of pieces of vehicle information are acquired, the processor 170 may provide a selection screen for allowing the user to select one of the plurality of pieces of acquired vehicle information.

The plurality of pieces of acquired vehicle information are displayed on the selection screen. In this case, the pieces of vehicle information are subjected to different display conditions according to a state of a corresponding vehicle, and then displayed. The display conditions may include at least one of a hue, a size, a lightness, a saturation, and a phase for display.

The state of the vehicle may include a state representing whether a corresponding vehicle provides a call connection service and also include a state representing whether the corresponding vehicle is a normal vehicle or an illegal vehicle (for example, a stolen vehicle or a vehicle in violation of road traffic laws).

When specific vehicle information for provision of the related services is selected, the processor 170 acquires service information related to the selected vehicle information and displays a list screen for the acquired service information.

In this case, the related services may include a call connection service, a text messaging service, a parking movement service, a black box request service, an accident information notification service, and a public information request service.

Furthermore, a driver may select a service to which access by others is permitted from among the services. Accordingly, others may use only the service to which access is permitted, which is selected by the driver.

Therefore, the processor 170 may display a list of services to which access is permitted and a list of services to which access is restricted such that the lists are distinguished from each other, on the list screen.

Furthermore, the processor 170 may transmit a message requesting access to the service to which access is restricted according to the user's request and selectively provide information on the service to which access is requested in response to a response message transmitted from the server.

Also, when a specific service of the services to which access is permitted is selected, the processor 170 provides information corresponding to the selected service. Details will be described below.

In the following, a method by which the processor 170 acquires vehicle information by using the stereo camera is described in more detail with reference to FIGS. 5 to 7.

Figure 5:
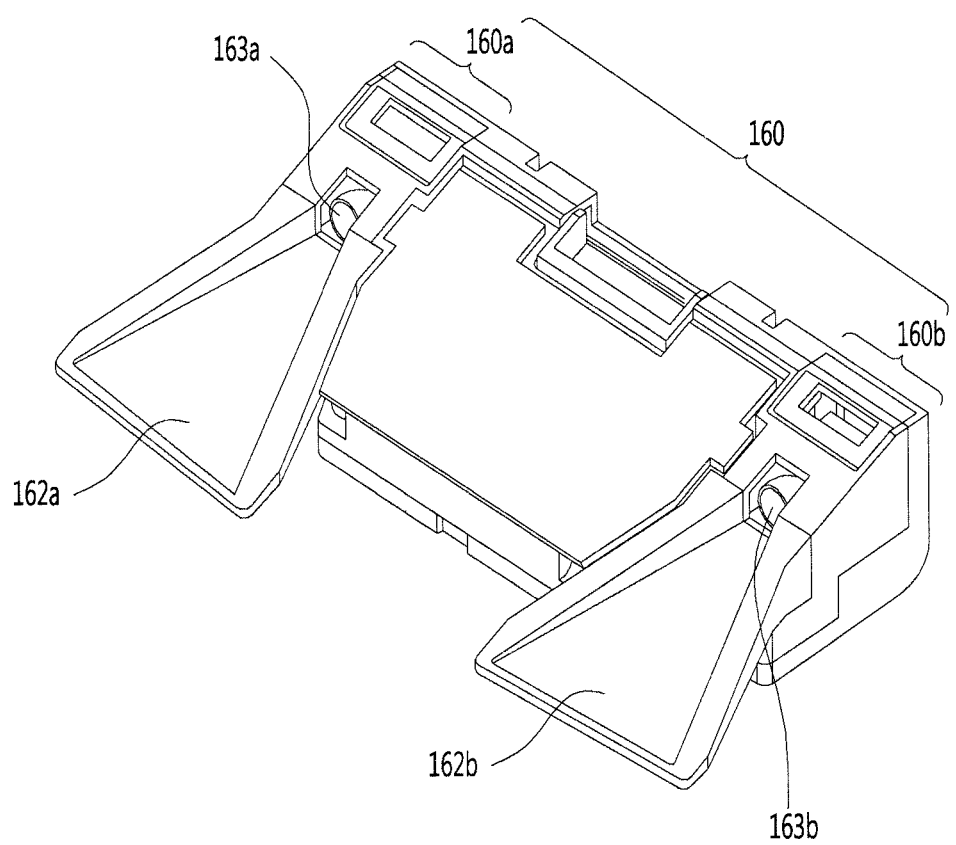
FIG. 5 is a diagram illustrating an example of a camera according to an embodiment of the present invention.
Figure 6:
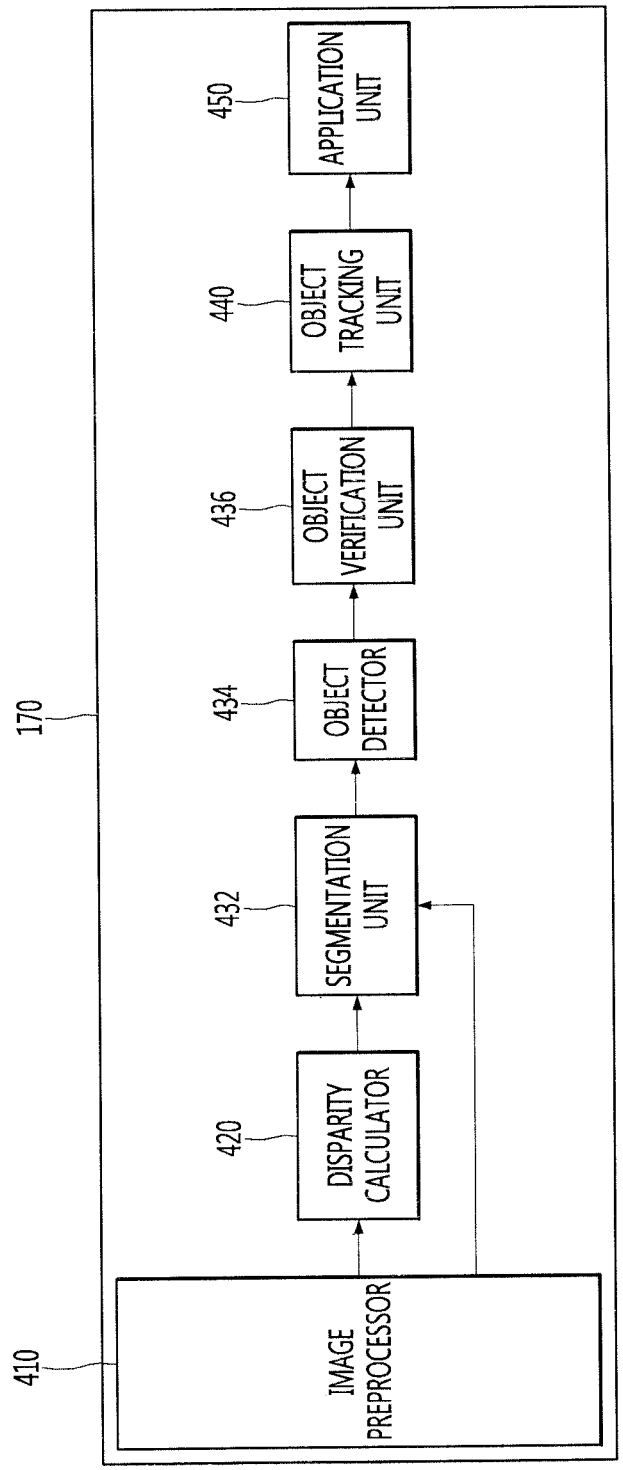
FIGS. 6 and 7 are diagrams for describing an example of a method of generating image information based on an image from a camera according to an embodiment of the present invention.
Figure 7:
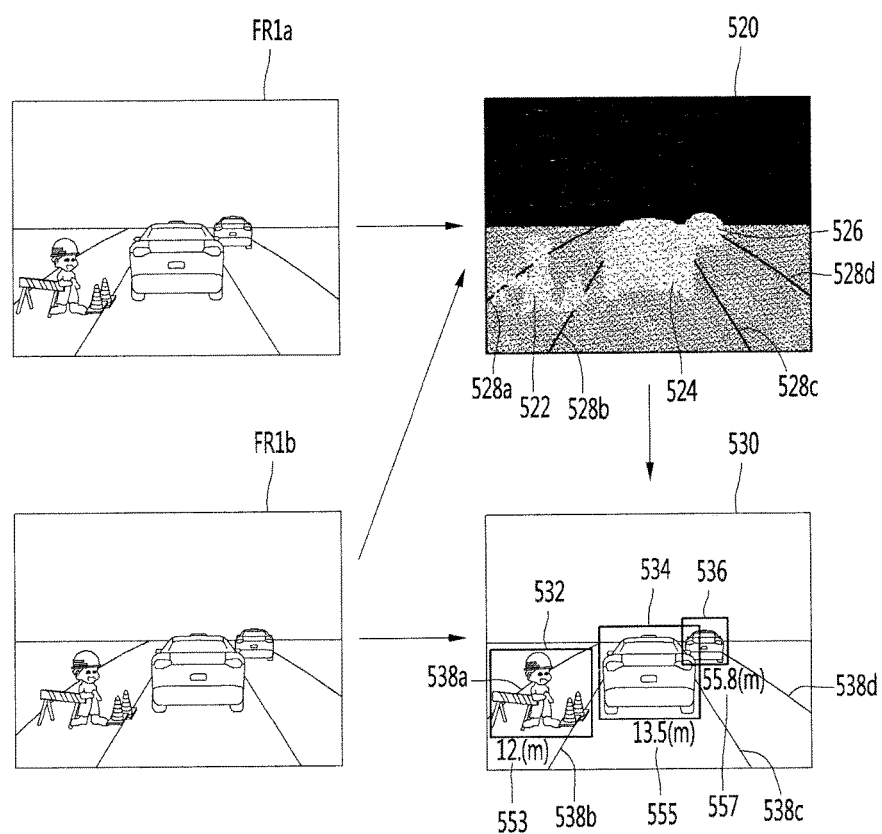

FIG. 5 is a diagram illustrating an example of a camera according to an embodiment of the present invention, and FIGS. 6 and 7 are diagrams for describing an example of a method of generating image information based on an image from a camera according to an embodiment of the present invention.

First, referring to FIG. 5, a stereo camera 160 may include a first camera 160*a* including a first lens 163*a*, and a second camera 160*b* including a second lens 163*b*.

The stereo camera 160 may further include a first light shield 162*a* and a second light shield 162*b* for preventing light from entering the first lens 163*a* and the second lens 163*b*, respectively.

The vehicle driver assistance apparatus 100 may acquire stereo images of surroundings of the vehicle from the first and second cameras 160*a* and 160*b*, perform disparity detection based on the stereo images, perform object detection on at least one stereo image based on the disparity information, and after the object detection, continue to track the motion of an object.

FIG. 6 is an example of the internal block diagram of the processor 170. The processor 170 of the vehicle driver assistance apparatus 100 may include an image preprocessor 410, a disparity calculator 420, an object detector 434, an object tracking unit 440, and an application unit 450. An image is illustrated or described as being processed in the order of the image preprocessor 410, the disparity calculator 420, the object detector 434, the object tracking unit 440, and the application unit 450 in FIG. 5 and the following description, but is not limited thereto.

The image preprocessor 410 may receive an image from the camera 160 and perform preprocessing.

In particular, the image preprocessor 410 may perform, on the image, noise reduction, rectification, calibration, color enhancement, color space conversion (CSC), interpolation, camera 160 gain control, or the like. Thus, it is possible to acquire an image clearer than a stereo image captured by the camera 160.

The disparity calculator 420 may receive an image signal-processed by the image preprocessor 410, perform stereo matching on the received image, and acquire a disparity map according to stereo matching. That is, it is possible to acquire disparity information on a stereo image in front of a vehicle.

In this case, the stereo matching may be performed on a pixel or predetermined block basis of the stereo images. The disparity map may mean a map that represents, by a numerical value, binocular parallax information on the stereo images, i.e., left and right images.

A segmentation unit 432 may perform segment and clustering on at least one of images based on disparity information from the disparity calculator 420.

In particular, the segmentation unit 432 may separate the background from the foreground for at least one of stereo images based on the disparity information.

For example, it is possible to calculate, an area of the disparity map in which the disparity information is less than or equal to a predetermined value, as the background and exclude a corresponding part. Thus, the foreground may be relatively separated. As another example, it is possible to calculate, an area of the disparity map in which the disparity information is equal to or greater than a predetermined value, as the foreground and extract a corresponding part. Due to this, the foreground may be separated.

As such, by separating the foreground from the background based on the disparity information extracted based on the stereo image, it is possible to reduce a signal processing speed, a signal processing amount, or the like when an object is detected later.

Next, the object detector 434 may detect an object based on an image segment from the segmentation unit 432.

That is, the object detector 434 may detect an object from at least one of images, based on the disparity information.

In particular, the object detector 434 may detect an object from at least one of images. For example, it is possible to detect an object from the foreground separated by the image segment.

Next, the object verification unit 436 may classify and verify the separated object.

To this end, the object verification unit 436 may use an identification method using a neural network, a support vector machine (SVM) method, an identification method by AdaBoost using Haar-like features, a histograms of oriented gradients (HOG) method, or the like.

The object verification unit 436 may compare objects stored in the memory 140 with detected objects to verify an object.

For example, the object verification unit 436 may verify a peripheral vehicle, lane, road surface, signpost, dangerous area, tunnel or the like around a vehicle.

The object tracking unit 440 may perform tracking on the verified object. For example, it is possible to verify objects in acquired stereo images, calculate the motion or motion vector of the verified objects, and track the movement of a corresponding object based on the calculated motion or motion vector, sequentially. Thus, it is possible to track the peripheral vehicle, lane, road surface, signpost, dangerous area, tunnel or the like around the vehicle.

Next, the application unit 450 may calculate the degree of risk of the vehicle based on various objects around the vehicle, such as another vehicle, lane, road surface, signpost or the like. Also, it is possible to calculate collision possibility with the front car, whether the vehicle slips, or the like.

In addition, based on the calculated degree of risk, collision possibility or slipping possibility, the application unit 450 may output, as driver assistance information, a message for notifying a user of such information. Alternatively, it is also possible to generate, a control signal for posture control or driving control, as vehicle control information.

The image preprocessor 410, the disparity calculator 420, the segmentation unit 432, the object detector 434, the object verification unit 436, the object tracking unit 440 and the application unit 450 may be the internal components of the image processor in the processor 170.

According to an embodiment, the processor 170 may include only some of the image preprocessor 410, the disparity calculator 420, the segmentation unit 432, the object detector 434, the object verification unit 436, the object tracking unit 440 and the application unit 450. If the camera 160 includes a mono camera 160 or around view camera 160, the disparity calculator 420 may be excluded. According to an embodiment, the segmentation unit 432 may also be excluded.

Referring to FIG. 7, the camera 160 may acquire a stereo image for a first frame section.

The disparity calculator 420 in the processor 170 may receive stereo images FR1*a* and FR1*b* signal-processed by the image preprocessor 410, and perform stereo matching on the received stereo images FR1*a* and FR1*b* to acquire a disparity map 520.

The disparity map 520 represents parallax between the stereo images FR1*a* and FR1*b* according to level, and it is possible to calculate that the higher a disparity level is, the shorter a distance to a vehicle is, and the lower the disparity level is, the longer the distance to the vehicle is.

When there is a need to display such a disparity map, the disparity map may also be displayed to have high luminance the higher the disparity level is and to have low luminance the lower the disparity level is.

FIG. 7 illustrates that in the disparity map 520, first to fourth lanes 528*a* to 528*d* respectively have corresponding disparity levels, and a construction area 522, a first front vehicle 524, and a second front vehicle 526 respectively have corresponding disparity levels.

The segmentation unit 432, the object detector 434, and the object verification unit 436 perform segment, object detection, and object verification on at least one of the stereo images FR1*a* and FR1*b* based on the disparity map 520.

FIG. 7 illustrates how to detect and verify an object on the second stereo image FR1*b* by using the disparity map 520.

That is, in an image 530, object detection and verification may be performed on first to fourth lanes 538*a* to 538*d*, a construction area 532, a first front vehicle 534, and a second front vehicle 536.

The vehicle driver assistance apparatus 100 may accurately detect what a peripheral object is and where the peripheral object is located by using the sensor unit through the image processing as described above. In this way, the vehicle driver assistance apparatus 100 may acquire a vehicle number by analyzing a region corresponding to the vehicle number in the object when the peripheral object is a vehicle, and provide various services related to the acquired vehicle number.

According to the embodiment of the present invention, it is possible to provide various services related to the vehicle number by using the vehicle number, enabling optimized information sharing in various driving environments.

Also, according to the embodiment of the present invention, it is possible to remove a need for the driver to directly check a contact of a driver of a counterpart vehicle, minimizing possibility of accidents which may occur during driving, and therefore, increasing satisfaction of the user.

FIGS. 8 to 19 are diagrams for describing a method of providing related services in a vehicle driver assistance apparatus according to an embodiment of the present invention.

Figure 8:
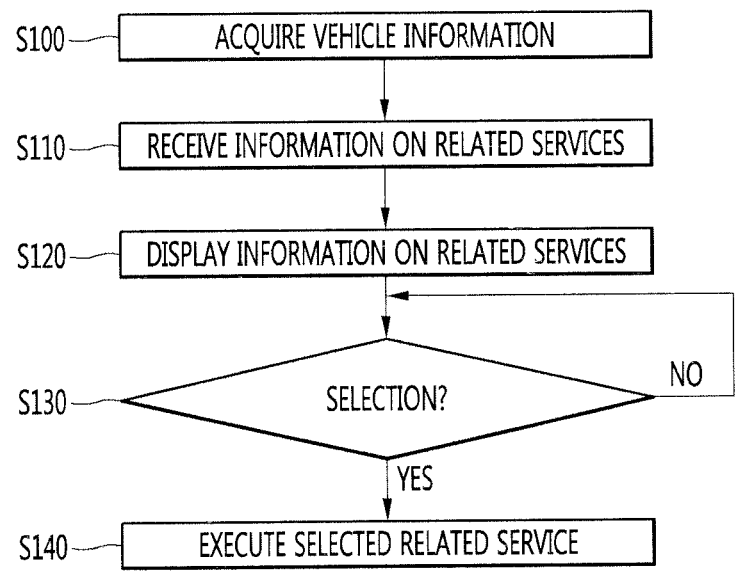
FIGS. 8 to 19 are diagrams for describing a method of providing related services in a vehicle driver assistance apparatus according to an embodiment of the present invention.

Referring to FIG. 8, the vehicle driver assistance apparatus 100 acquires vehicle information of an object that is a subject for provision of related services (step 100). When the object is a vehicle, the vehicle information may be a vehicle number of the vehicle.

A method of acquiring the vehicle information may include an automatic acquisition method of automatically acquiring the vehicle information and a manual acquisition method of allowing a user to directly input the vehicle information.

The automatic acquisition method may be implemented by the camera 160.

First, the camera 160 captures an image of surroundings in order to acquire the vehicle information. The camera 160 detects an object in the captured image. The detected object may include a vehicle, a pedestrian, a motorcycle, a bicycle, a baby carriage, and the like.

The camera 160 may determine a type of the detected object and separately detect only an object of which the type is a vehicle.

The camera 160 may acquire vehicle information of the detected object by analyzing a vehicle number included in a specific region of the detected object.

Figure 9:
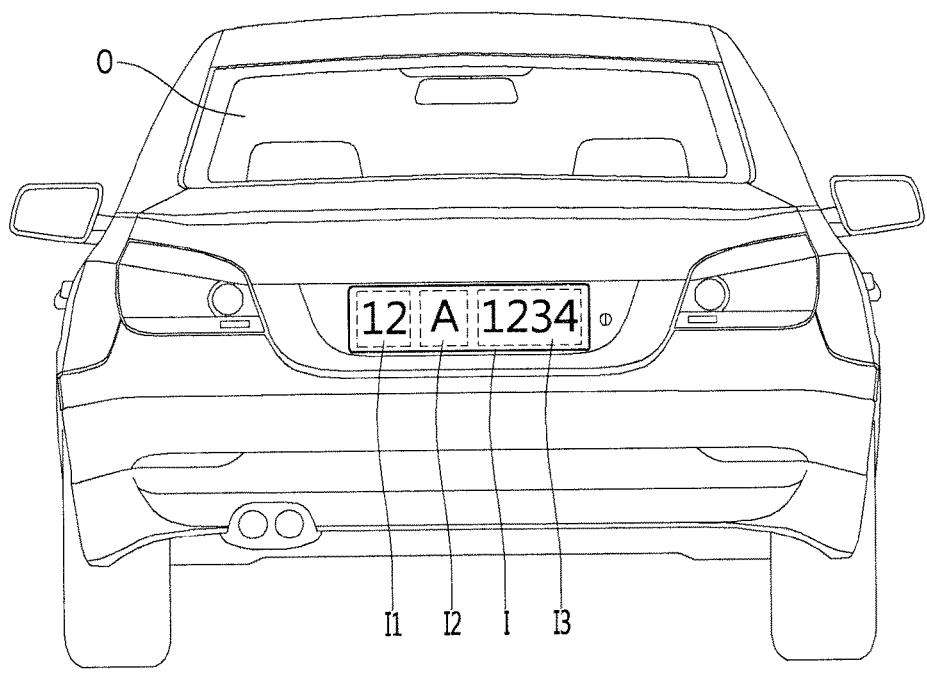

Referring to FIG. 9, the camera 160 captures an image of surroundings and detects an object O existing around the vehicle. When the detected object O is a vehicle, vehicle information I for the vehicle number included in the specific region of the object is acquired.

In this case, the camera 160 may acquire only the vehicle information for the vehicle number of the object O and further acquire additional information by using the vehicle information.

That is, the vehicle information I including the vehicle number is configured by first information I1, second information I2, and third information I3.

The first information I1 represents the type of a corresponding vehicle. The second information I2 represents the use of a corresponding vehicle. The third information I3 represents the registered number of a corresponding vehicle.

Therefore, the camera 160 may further acquire the type and the use of the vehicle, as well as the vehicle number of the object by using the acquired vehicle information I.

On the other hand, the camera 160 may detect an object O which is driving ahead, beside, and behind the vehicle during driving and acquire the vehicle information I.

Also, the camera 160 may detect an object O which is driving or standing/parking ahead, beside, and behind the vehicle during driving or standing of the vehicle, and acquire the vehicle information I.

In this case, the vehicle information I which can be acquired by the camera 160 has limits and the vehicle information I cannot be acquired with respect to an object O out of a capture range of the camera 160.

Therefore, the manual acquisition method is further provided in addition to the automatic acquisition method using the camera 160 according to the present invention.

Figure 10:
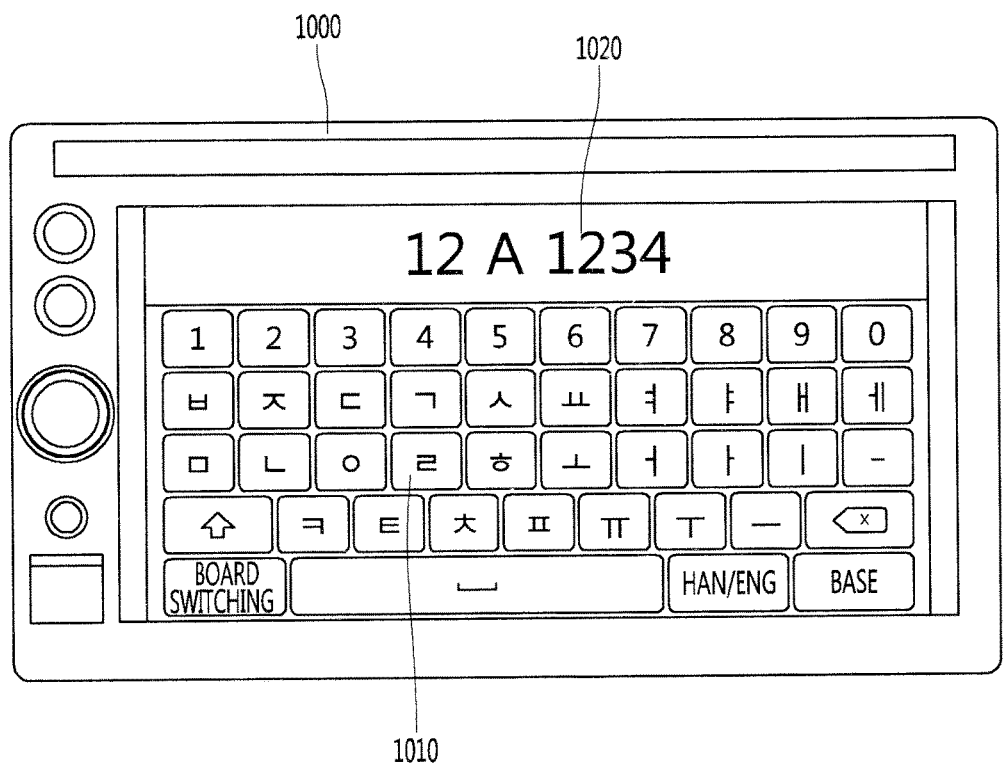

Referring to FIG. 10, the display unit 180 provides a vehicle information input screen 1000 in order for manual acquisition of the vehicle information I.

The vehicle information input screen 1000 includes a character selection region 1010 for selection of input characters and a character input region 1020 for input of characters selected through the character selection region 1010.

Therefore, the driver may select characters corresponding to the vehicle information I from characters displayed on the character selection region 1010 according to the driver's desires and input the vehicle information I.

Furthermore, the processor 170 may acquire the vehicle information I for the characters selected through the character selection region 1010.

Referring back to FIG. 8, the processor 170 receives the vehicle information I acquired through the camera 160 or the vehicle information input screen 1000 and receives information on services related to the vehicle information I (step 110).

The related services may be services which a driver of a vehicle corresponding to the acquired vehicle information I subscribes, or a service to which the driver permits access, from among the subscribed services.

The services which the driver can subscribe may include a call connection service, a text messaging service, a parking movement service, a black box request service, an accident information notification service, a public information request service, and the like.

Also, the driver can distinguish between a service to which the driver permits access of others and a service to which the driver restricts access of others, from among the subscribed services.

Therefore, the processor 170 receives information on services which the driver of a vehicle corresponding to the acquired vehicle information I subscribes or a service to which access is permitted, from among the subscribed services.

The processor 170 outputs the received information on the related services (step 120).

Figure 11:
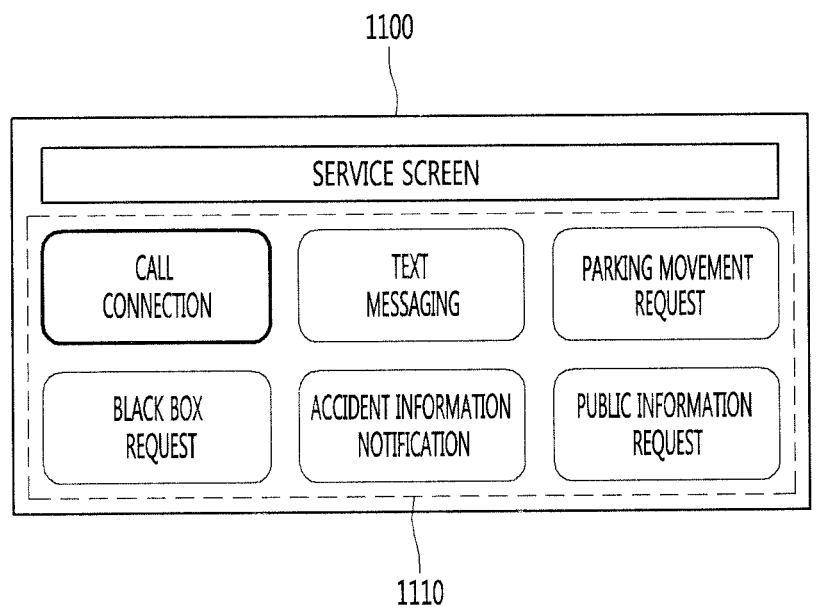

Referring to FIG. 11, the processor 170 displays a service screen 1100 including the received information on the related services through the display unit 180.

The service screen 1100 includes a service list display region 1110 on which a list of services related to the acquired vehicle information I is displayed.

As illustrated in FIG. 11, service lists for a call connection service, a text messaging service, a parking movement service, a black box request service, an accident information notification service, and a public information request service are respectively displayed on the service list display region 1110.

The driver may select any one of the service lists displayed on the service list display region 1110 and use a service related to the acquired vehicle information I.

It can be seen from FIG. 11 that the service lists displayed on the service list display region 1110 are all activated to be selectable. However, the service list to which access is restricted may be displayed as being deactivated.

Figure 12:
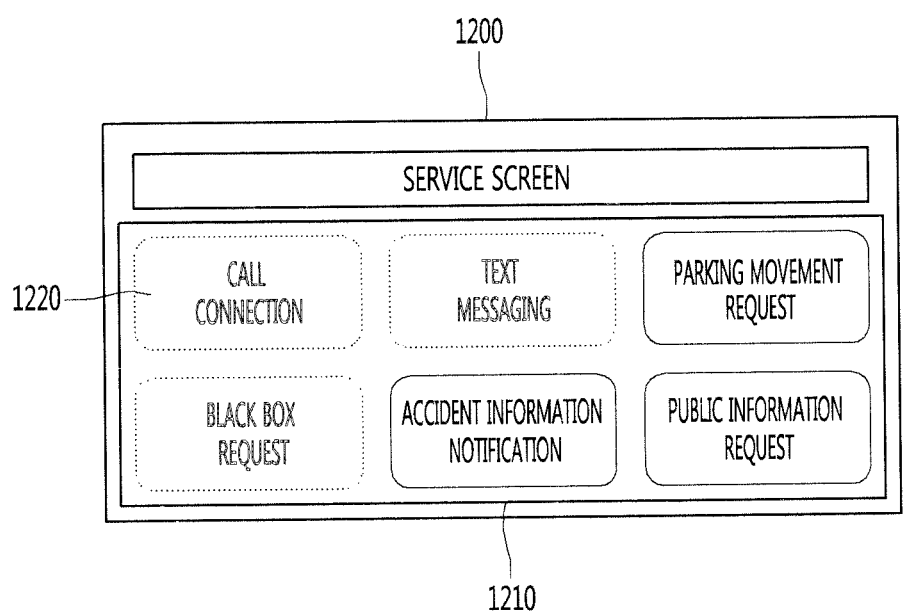

Referring to FIG. 12, as described above, the service lists for the call connection service, the text messaging service, the parking movement service, the black box request service, the accident information notification service, and the public information request service are respectively displayed on the service screen 1200.

In this case, the service lists may include a first list 1210 to which access is permitted and a second list 1220 to which access is restricted.

The first list 1210 may include the parking movement service, the accident information notification service, and the public information request service. Furthermore, the second list 1220 may include the call connection service, the text messaging service, and the black box request service.

As illustrated in FIG. 12, service lists corresponding to the first list 1210 are displayed as being in an activated state so as to be selectable by the driver, and service lists corresponding to the second list 1220 are displayed as being in a deactivated state not to be selectable by the driver.

On the other hand, when a plurality of pieces of vehicle information I are acquired through the camera 160, in order words, when a plurality of objects O corresponding to the vehicle are detected, the processor 170 may further provide a selection screen for selecting any one object O that is a subject for the related services, from among the plurality of objects O.

Figure 13:
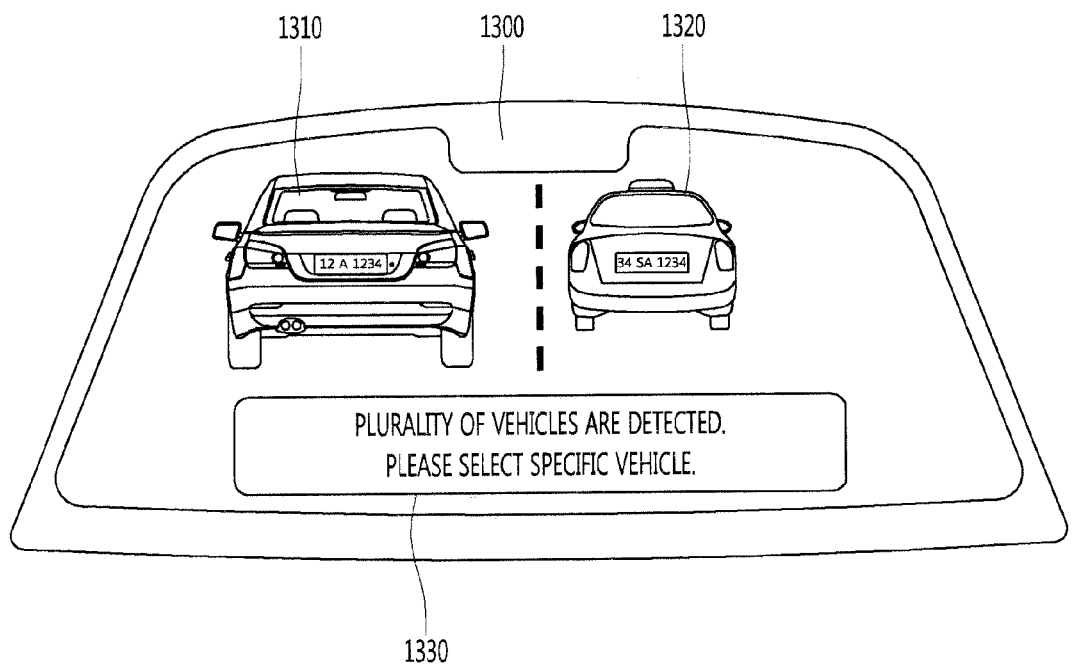

That is, referring to FIG. 13, when a plurality of objects O are detected through the camera 160, the processor 170 provides the selection screen 1300 for selecting any one of the plurality of objects O through the display unit 180.

The selection screen 1300 includes an object information display region on which information corresponding to the detected objects O is displayed.

That is, when the detected objects includes a first object and a second object, the object information display region includes a first object information display region 1310 on which information corresponding to the first object is displayed and a second object information display region 1320 on which information corresponding to the second object is displayed.

In addition, a selection message 1330 for selecting any one object that is a subject for the related services from among the first object displayed on the first object information display region 1310 and the second object displayed on the second object information display region may be further displayed on the selection screen 1300.

Accordingly, the user can select a specific object that is a subject for the related services by using information on the objects displayed on the object information display region.

On the other hand, information indicating whether a specific related service provided by each object is usable or not may be further displayed on the selection screen 1300.

Figure 14:
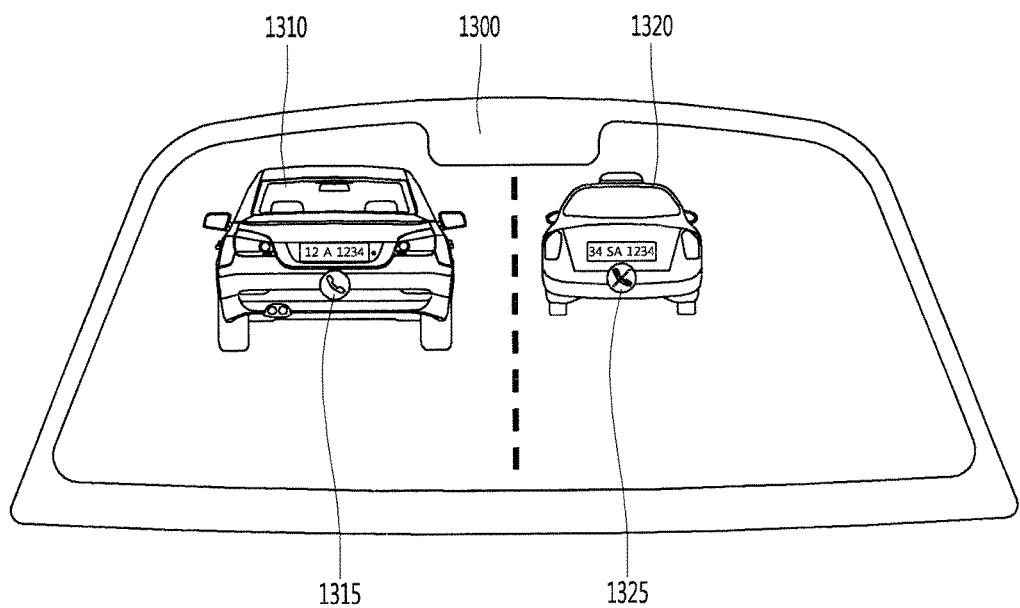

Referring to FIG. 14, the selection screen 1300 includes an object information display region on which information corresponding to the detected objects O is displayed.

That is, when the detected objects includes a first object and a second object, the object information display region includes a first object information display region 1310 on which information corresponding to the first object is displayed and a second object information display region 1320 on which information corresponding to the second object is displayed.

In addition, the user can perform setting of information on the specific related service to be displayed on the selection screen. The following description is given under the assumption that the set information is the call connection service, but is not limited thereto. It is obvious that the set information may be the text messaging service, the parking movement service, the black box request service, or the like.

First information 1315 indicating whether the call connection service for the first object is usable or not may be displayed on the first object information display region 1310, and second information 1325 indicating whether the call connection service for the second object is usable or not may be displayed.

The first information 1315 represents that the call connection service is usable and the second information 1325 represents that the call connection service is unusable.

In this case, whether the call connection service is usable or not may be determined depending on a position of the driver of the vehicle with respect to a corresponding object.

That is, when the driver of a vehicle corresponding to the first object is located in a predetermined distance from a current position of the vehicle, the call connection service is usable and therefore, the first information 1315 as described above is displayed.

Furthermore, when the driver of a vehicle corresponding to the second object is located out of the predetermined distance from a current position of the vehicle, the call connection service is unusable and therefore, the second information 1325 as described above is displayed.

On the other hand, additional information for the detected object may be further displayed on the selection screen 1300. The additional information may be information indicating whether a vehicle for a corresponding object is an illegal vehicle.

Figure 15:
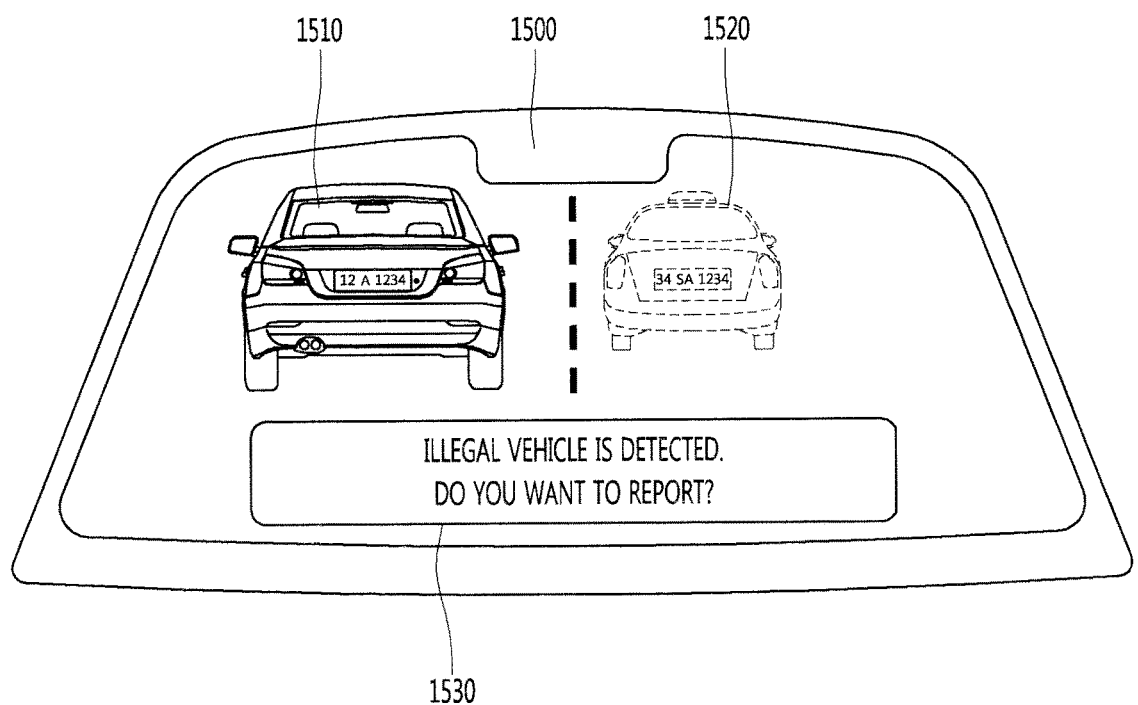

Referring to FIG. 15, as described above, the processor 170 displays a selection screen for selecting any one object from among objects detected by the camera 160 through the display unit 180.

When the detected objects includes a first object and a second object, the selection screen 1500 includes a first object information display region 1510 on which information corresponding to the first object is displayed and a second object information display region 1520 on which information corresponding to the second object is displayed.

In this case, the processor 170 may collect information on the objects from the server and determine whether a vehicle corresponding to the detected object is an illegal vehicle. In addition, the processor 170 may detect whether the vehicle corresponding to the object violates road traffic laws by tracking the detected object.

Accordingly, the processor 170 may determine whether each of vehicles corresponding to the plurality of detected objects is an illegal vehicle. The illegal vehicle may include a stolen vehicle.

The processor 170 may display pieces of objet information such that the pieces of objet information are distinguished from each other, depending on whether a vehicle is an illegal vehicle.

That is, when the first object is a normal vehicle, the object information may be displayed with a solid line on the first object information display region 1510 on which information corresponding to the first object is displayed.

In addition, when the second object is a stolen vehicle or an illegal vehicle violating the road traffic laws, the object information may be displayed with a dotted line on the second object information display region 1520 on which information corresponding to the second object is displayed.

On the selection screen 1500, a message inquiring whether to report the second object which is detected as the illegal vehicle 1530 may be further displayed. Therefore, the user may determine whether to report the second object.

The processor 170 may transmit report information including vehicle information, information on the current position of the second object, and the like to a related institution, depending on whether the user selects a report on illegality of the second object.

Figure 16:
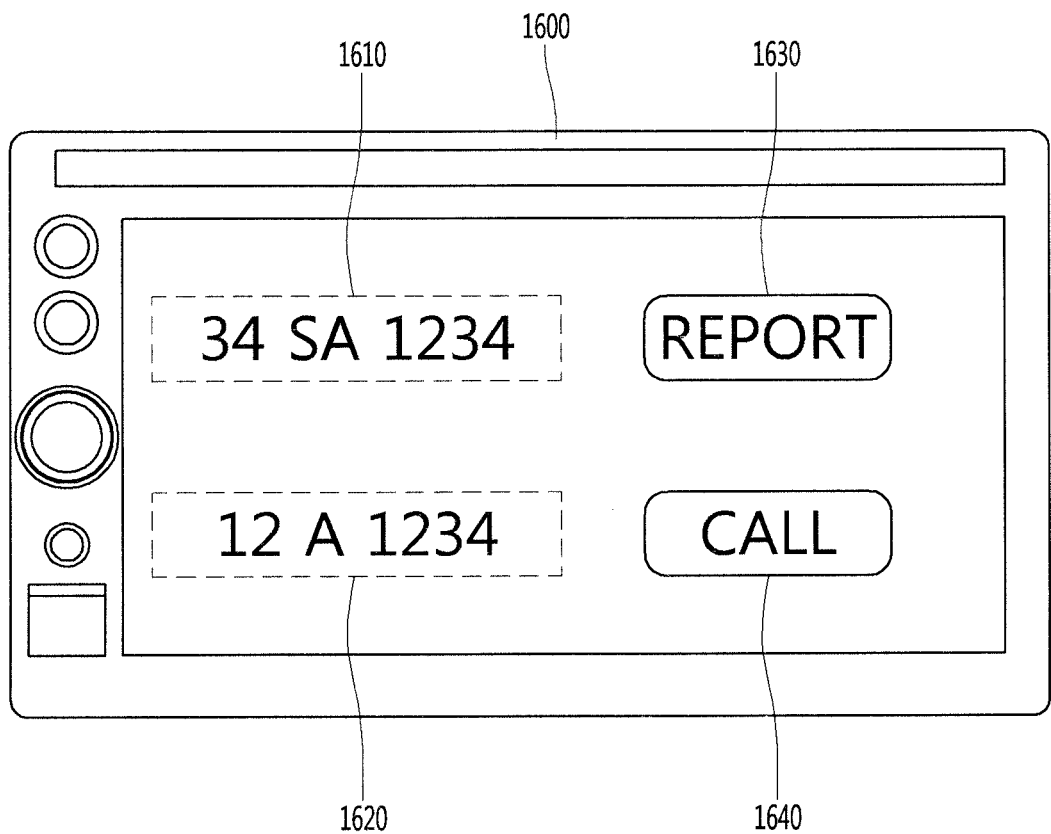

Referring to FIG. 16, the processor 170 may display information on related services for the detected object.

That is, the processor 170 may display information on the detected object and information on a representative service of services related to the detected object.

Referring to FIG. 16, a related service information screen 1600 may include a first region 1610 on which the vehicle information I for the first object which is detected is displayed and a second region 1620 on which the vehicle information I for the second object is displayed.

Furthermore, the related service information screen 1600 may include a third region 1630 on which the information on the representative service related to the first object is displayed and a fourth region 1640 on which the information on the representative service related to the second object is displayed.

When the first object is an illegal vehicle, the representative service displayed on the third region 1630 may be a report service.

When the second object is a normal vehicle and the call connection therefor is possible, the representative service displayed on the fourth region may be the call connection service.

On the other hand, when a driver subscribes the call connection service corresponding to a related vehicle number and registers a telephone number corresponding to a mobile terminal related to the vehicle number according to the subscription, the call connection service may be possibly performed. In this case, others which intend to use the call connection service may know only the vehicle number of the vehicle, minimizing exposure of private information because a telephone number related to the vehicle number is unknown.

Also, when the call connection service is executed, information on the call connection service is displayed on a mobile terminal that is the subject for call connection.

Figure 17:
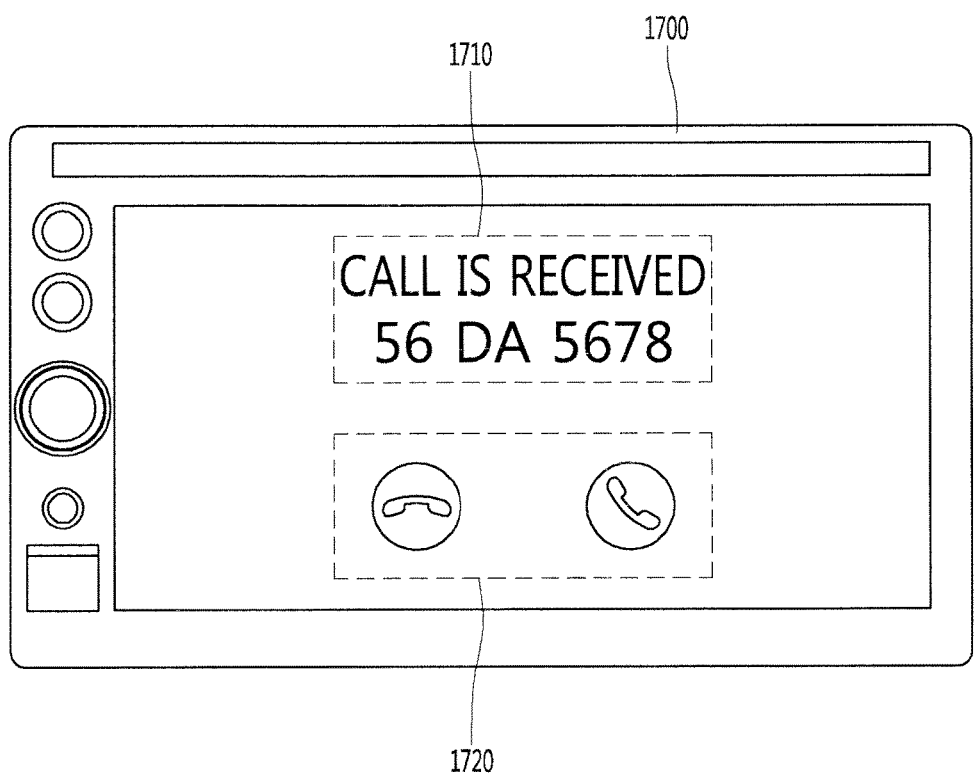

That is, referring to FIG. 17, when the call connection service is executed, a reception screen including information on a caller is displayed on a mobile terminal of a recipient.

A caller information display region 1710 on which information on the caller is displayed is included in the reception screen 1700. In this case, caller information displayed on the caller information display region 1710 includes a vehicle number of a vehicle owned by the caller in addition to telephone number information of the mobile terminal of the caller.

Also, the reception screen 1700 includes a connection selection screen 1720 for determining whether to accept or reject the call connection.

On the other hand, the related services include the public information request service. Therefore, each user may associate specific data with the vehicle number of a vehicle owned by the user herself/himself and transmit the associated data according to the use of the service.

That is, the data may include advertisement data or the like.

Figure 18:
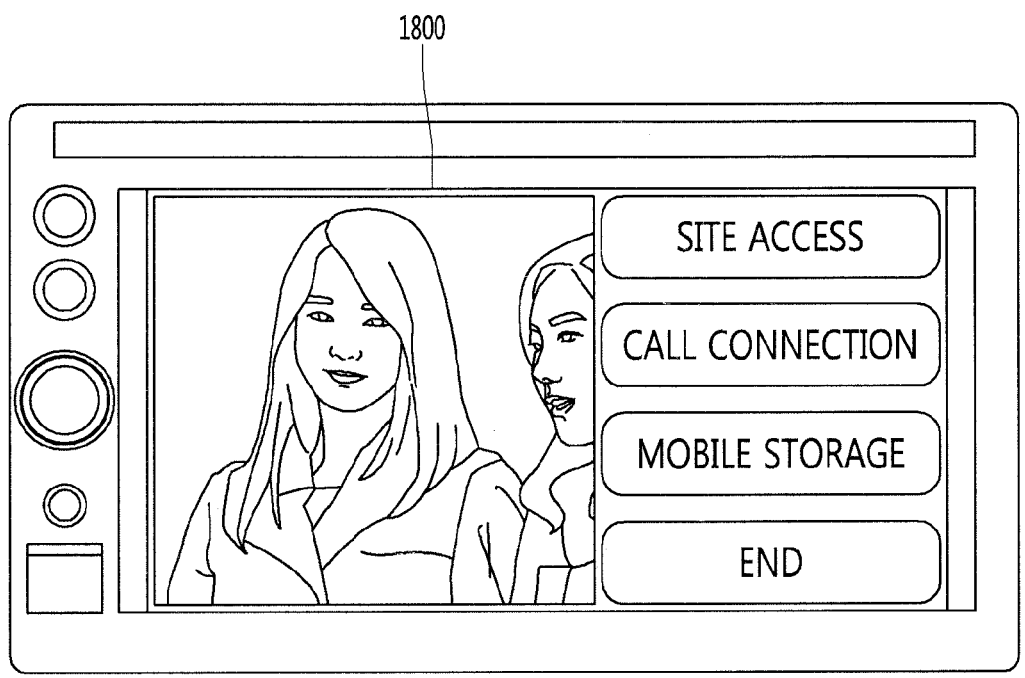

Referring to FIG. 18, when the public information request service is selected, the processor 170 requests public information from a user corresponding to the acquired vehicle information I and displays data received in response to the public information request.

For example, the acquired object may be a school bus for an English institute. In this case, the associated data may be advertisement data for advertising the English institute.

On the other hand, a user who uses the service may use only a service to which a user who is a subject for the use of the service permits access is permitted.

In this case, the processor 170 may transmit a signal for requesting sharing of information to the user who is a subject for the use of the service in order to use a service to which access is restricted.

For example, when an accident of the vehicle occurs in the vicinity of the detected object and a black box is not mounted on the vehicle, the processor 170 may use the black box request service for requesting sharing of black box information from a driver of a vehicle corresponding to the detected object O.

Figure 19:
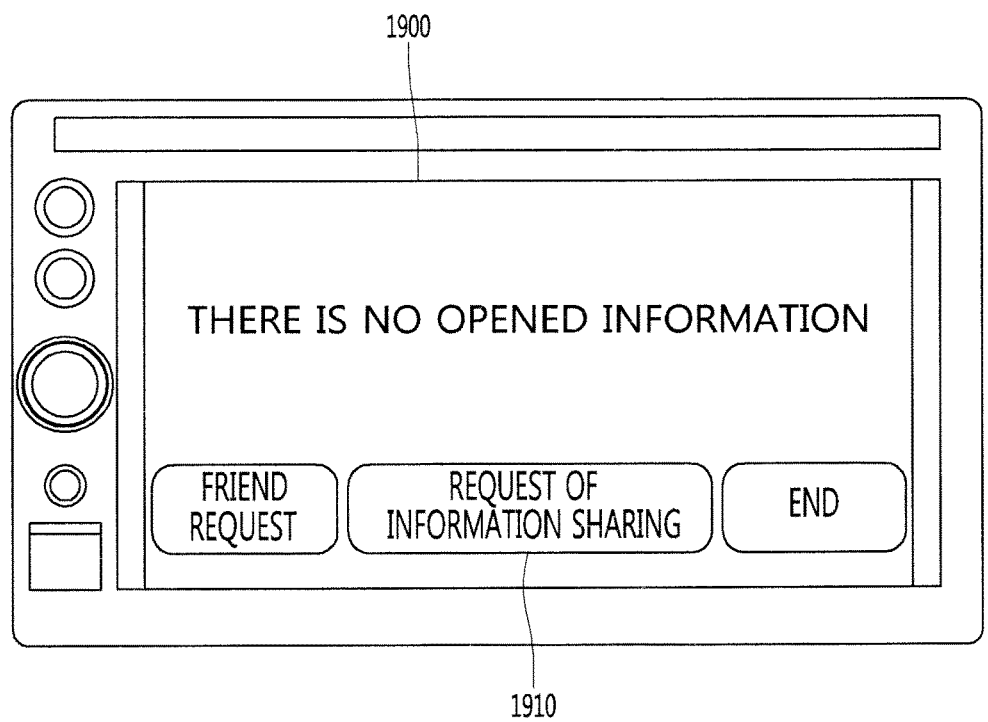

In this case, as illustrated in FIG. 19, when access to the black box request service is restricted, the processor 170 displays a notification screen 1900 which notifies that there is no opened information due to access restriction.

Also, the notification screen 1900 includes an information sharing request menu 1910 for requesting permission of access to a specific service to which access is restricted, and the processor 170 transmits a signal requesting permission of access to the service to which access is restricted to a driver of a vehicle corresponding to the object O when the information sharing request menu 1910 is selected.

According to the embodiments of the present invention, it is possible to provide various services related to the vehicle number by using the vehicle number, enabling optimized information sharing in various driving environments.

Also, according to the embodiments of the present invention, it is possible to remove a need for the driver to directly check a contact of a driver of a counterpart vehicle, minimizing possibility of accidents which may occur during driving, and therefore, increasing satisfaction of the user.

Figure 20:
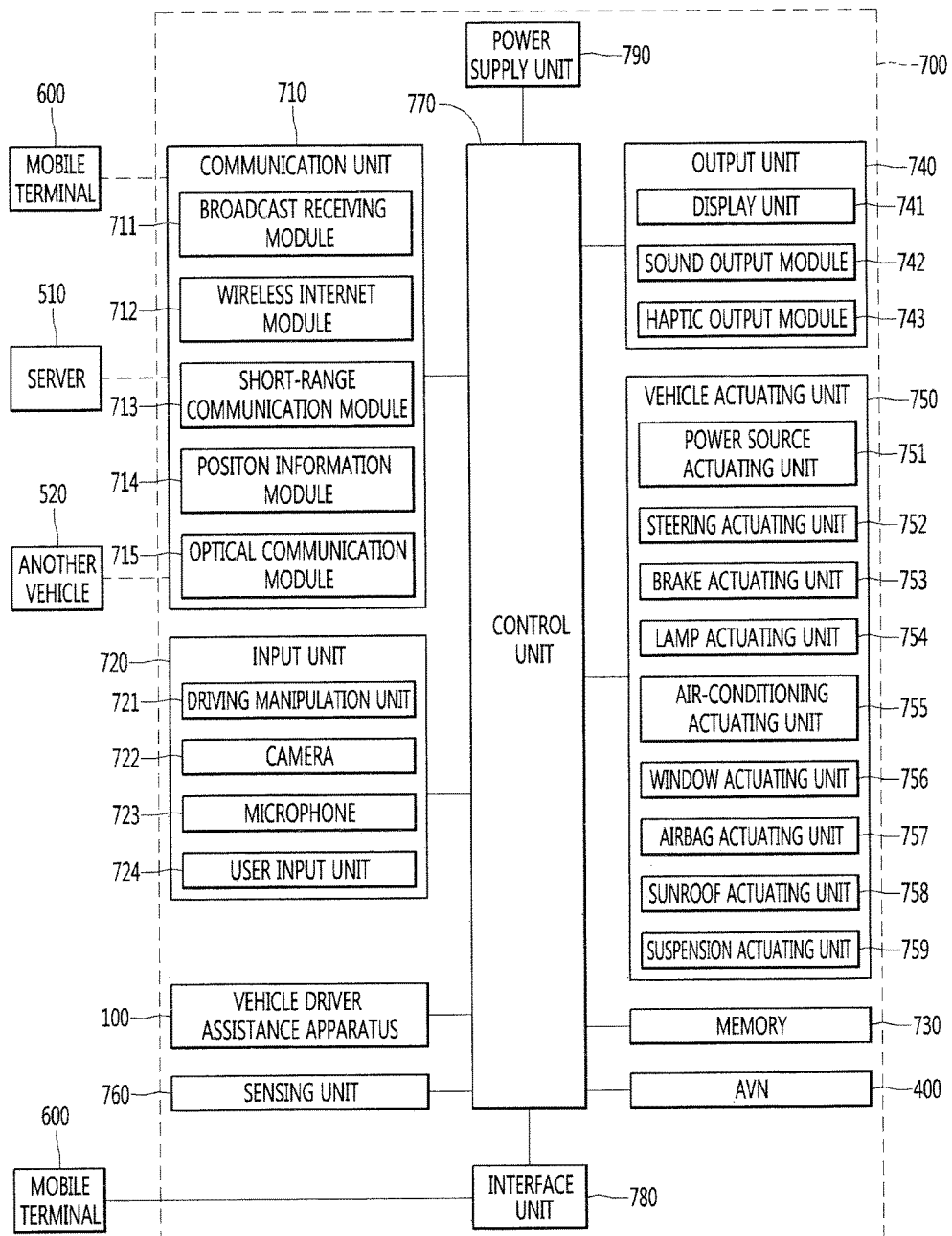
FIG. 20 is an example of an internal block diagram of the vehicle of FIG. 1 including the vehicle driver assistance apparatus.

Referring to FIG. 20, the above-described vehicle driver assistance apparatus 100 may be included in the vehicle 700.

The vehicle 700 may include a communication unit 710, an input unit 720, a sensing unit 760, an output unit 740, a vehicle drive unit 750, a memory 730, an interface 780, a controller 770, a power supply unit 790, a driver assistance apparatus 100 and AVN device 400. Here, among the units included in the driver assistance apparatus 100 and the units of the vehicle 700, the units having the same names are described as being included in the vehicle 700.

The communication unit 710 may include one or more modules which permit communication such as wireless communication between the vehicle and the mobile terminal 600, between the vehicle and the external server 50 or between the vehicle and the other vehicle 510. Further, the communication unit 710 may include one or more modules which connect the vehicle to one or more networks.

The communication unit 710 includes a broadcast receiving module 711, a wireless Internet module 712, a short-range communication module 713, and an optical communication module 715.

The broadcast receiving module 711 receives a broadcast signal or broadcast related information from an external broadcast management server through a broadcast channel. Here, the broadcast includes a radio broadcast or a TV broadcast.

The wireless Internet module 712 refers to a wireless Internet access module and may be provided inside or outside the vehicle. The wireless Internet module 712 transmits and receives a wireless signal through a communication network according to wireless Internet access technologies.

Examples of such wireless Internet access technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 712 may transmit/receive data according to one or more of such wireless Internet technologies, and other Internet technologies as well. For example, the wireless Internet module 712 may wirelessly exchange data with the external server 500. The wireless Internet module 712 may receive weather information and road traffic state information (e.g., transport protocol experts group (TPEG) information) from the external server 500.

The short-range communication module 713 is configured to facilitate short-range communication. Such short-range communication may be supported using at least one of Bluetooth™, Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, Wireless USB (Wireless Universal Serial Bus), and the like.

The short-range communication module 713 may form a wireless local area network to perform short-range communication between the vehicle and at least one external device. For example, the short-range communication module 713 may wirelessly exchange data with the mobile terminal 600. The short-range communication module 713 may receive weather information and road traffic state information (e.g., transport protocol experts group (TPEG) information) from the mobile terminal 600. When a user rides in the vehicle, the mobile terminal 600 of the user and the vehicle may pair with each other automatically or by executing the application of the user.

A location information module 714 acquires the location of the vehicle and a representative example thereof includes a global positioning system (GPS) module. For example, the vehicle may acquire the location of the vehicle using a signal received from a GPS satellite upon utilizing the GPS module.

The optical communication module 715 may include a light emitting unit and a light reception unit.

The light reception unit may convert a light signal into an electric signal and receive information. The light reception unit may include a photodiode (PD) for receiving light. The photodiode may covert light into an electric signal. For example, the light reception unit may receive information on a preceding vehicle through light emitted from a light source included in the preceding vehicle.

The light emitting unit may include at least one light emitting element for converting electrical signals into a light signal. Here, the light emitting element may be a Light Emitting Diode (LED). The light emitting unit converts electrical signals into light signals to emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the vehicle. For example, the light emitting unit may be at least one selected from among a headlight, a taillight, a brake light, a turn signal, and a sidelight. For example, the optical communication module 715 may exchange data with the other vehicle 510 via optical communication.

The input unit 720 may include a driving operation unit 721, a camera 195, a microphone 723 and a user input unit 724.

The driving operation unit 721 receives user input for driving of the vehicle (see FIG. 2). The driving operation unit 721 may include a steering input unit 721A, a shift input unit 721D, an acceleration input unit 721C and a brake input unit 721B.

The steering input unit 721A is configured to receive user input with regard to the direction of travel of the vehicle. The steering input unit 721A may include a steering wheel using rotation. In some embodiments, the steering input unit 721A may be configured as a touchscreen, a touch pad, or a button.

The shift input unit 721D is configured to receive input for selecting one of Park (P), Drive (D), Neutral (N), and Reverse (R) gears of the vehicle from the user. The shift input unit 721D may have a lever form. In some embodiments, the shift input unit 721D may be configured as a touchscreen, a touch pad, or a button.

The acceleration input unit 721C is configured to receive input for acceleration of the vehicle from the user. The brake input unit 721B is configured to receive input for speed reduction of the vehicle from the user. Each of the acceleration input unit 721C and the brake input unit 721B may have a pedal form. In some embodiments, the acceleration input unit 721C or the brake input unit 721B may be configured as a touchscreen, a touch pad, or a button.

The camera 722 may include an image sensor and an image processing module. The camera 722 may process a still image or a moving image obtained by the image sensor (e.g., CMOS or CCD). In addition, the image processing module processes the still image or the moving image acquired through the image sensor, extracts necessary information, and delivers the extracted information to the controller 770. The vehicle may include the camera 722 for capturing the front image of the vehicle or the image of the vicinity of the vehicle and the monitoring unit for capturing the image of the space inside the vehicle.

The monitoring unit may acquire an image of a passenger. The monitoring unit may acquire an image for biometric information of the passenger.

Although the monitoring unit and the camera 722 are included in the input unit 720 in FIG. 20, the camera 722 may be included in the driver assistance apparatus 100 as described above.

The microphone 723 may process external sound signals into electrical data. The processed data may be utilized in various ways according to a function that the vehicle is performing. The microphone 723 may convert a user voice command into electrical data. The converted electrical data may be transmitted to the controller 770.

Meanwhile, in some embodiments, a camera 722 or the microphone 723 may not be included in the input unit 720 but may be included in the sensing unit 760.

The user input unit 724 is configured to receive information from the user. When information is input via the user input unit 724, the controller 770 may control the operation of the vehicle to correspond to the input information. The user input unit 724 may include a touch input unit or a mechanical input unit. In some embodiments, the user input unit 724 may be located in a region of the steering wheel. In this case, the driver may operate the user input unit 724 with the fingers while gripping the steering wheel.

The sensing unit 760 is configured to sense signals associated with, for example, signals related to driving of the vehicle. To this end, the sensing unit 760 may include a collision sensor, a wheel sensor, a speed sensor, tilt sensor, a weight sensor, a heading sensor, a yaw sensor, a gyro sensor, a position module, a vehicle forward/reverse sensor, a battery sensor, a fuel sensor, a tire sensor, a steering sensor based on rotation of the steering wheel, a vehicle interior temperature sensor, a vehicle interior humidity sensor, an ultrasonic sensor, a radar, a Lidar, etc.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle information, etc.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric sensor. The biometric sensor senses and acquires biometric information of the passenger. The biometric information may include fingerprint information, iris-scan information, retina-scan information, hand geometry information, facial recognition information, and voice recognition information. The biometric sensor may include a sensor for sensing biometric information of the passenger. Here, the monitoring unit 150 and the microphone 723 may operate as a sensor. The biometric sensor may acquire hand geometry information and facial recognition information through the monitoring unit 150.

The output unit 740 is configured to output information processed by the controller 770. The output unit 740 may include a display unit 741, a sound output unit 742, and a haptic output unit 743.

The display unit 741 may display information processed by the controller 770. For example, the display unit 741 may display vehicle associated information. Here, the vehicle associated information may include vehicle control information for direct control of the vehicle or driver assistance information for aiding in driving of the vehicle. In addition, the vehicle associated information may include vehicle state information that indicates the current state of the vehicle or vehicle traveling information regarding traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle and the user and also function to provide an output interface between the vehicle and the user. In this case, the display unit 741 may include a touch sensor which senses a touch to the display unit 741 so as to receive a control command in a touch manner. When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

Meanwhile, the display unit 741 may include a cluster to allow the driver to check vehicle state information or vehicle traveling information while driving the vehicle. The cluster may be located on a dashboard. In this case, the driver may check information displayed on the cluster while looking forward.

Meanwhile, in some embodiments, the display unit 741 may be implemented as a head up display (HUD). When the display unit 741 is implemented as a HUD, information may be output via a transparent display provided at the windshield. Alternatively, the display unit 741 may include a projector module to output information via an image projected onto the windshield.

The sound output unit 742 is configured to convert electrical signals from the controller 770 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control of a power source inside the vehicle.

For example, in the case where a fossil fuel based engine (not illustrated) is a power source, the power source drive unit 751 may perform electronic control of the engine. As such, the power source drive unit 751 may control, for example, an output torque of the engine. In the case where the power source drive unit 751 is an engine, the power source drive unit 751 may control the speed of the vehicle by controlling the output torque of the engine under the control of the controller 770.

In another example, in the case where an electric motor (not illustrated) is a power source, the power source drive unit 751 may perform control of the motor. As such, the power source drive unit 751 may control, for example, the RPM and torque of the motor.

The steering drive unit 752 may perform electronic control of a steering apparatus inside the vehicle. The steering drive unit 752 may change the direction of travel of the vehicle.

The brake drive unit 753 may perform electronic control of a brake apparatus (not illustrated) inside the vehicle. For example, the brake drive unit 753 may reduce the speed of the vehicle by controlling the operation of brakes located at wheels. In another example, the brake drive unit 753 may adjust the direction of travel of the vehicle leftward or rightward by differentiating the operation of respective brakes located at left and right wheels.

The lamp drive unit 754 may turn at least one lamp arranged inside and outside the vehicle on or off. In addition, the lamp drive unit 754 may control, for example, the intensity and direction of light of each lamp. For example, the lamp drive unit 754 may perform control of a turn signal lamp or a brake lamp.

The air conditioner drive unit 755 may perform electronic control of an air conditioner (not illustrated) inside the vehicle. For example, when the interior temperature of the vehicle is high, the air conditioner drive unit 755 may operate the air conditioner to supply cold air to the interior of the vehicle.

The window drive unit 756 may perform electronic control of a window apparatus inside the vehicle. For example, the window drive unit 756 may control opening or closing of left and right windows of the vehicle.

The airbag drive unit 757 may perform the electronic control of an airbag apparatus inside the vehicle. For example, the airbag drive unit 757 may control an airbag to be deployed in a dangerous situation.

The sunroof drive unit 758 may perform electronic control of a sunroof apparatus (not illustrated) inside the vehicle. For example, the sunroof drive unit 758 may control opening or closing of a sunroof.

The suspension drive unit 759 may perform electronic control of a suspension apparatus (not shown) inside the vehicle. For example, when a road surface is uneven, the suspension drive unit 759 may control the suspension apparatus to reduce vibrations of the vehicle.

The memory 730 is electrically connected to the controller 770. The memory 730 may store basic data of the unit, control data for operations control of the unit and input/output data. The memory 730 may be various storage apparatuses, which are implemented in a hardware manner, such as a ROM, RAM, EPROM, flash drive and hard drive. The memory 730 may store a variety of data for overall operation of the vehicle, such as a program for processing or control of the controller 770.

The interface 780 may serve as a passage for various kinds of external devices that are connected to the vehicle. For example, the interface 780 may have a port that is connectable to the mobile terminal 600 and may be connected to the mobile terminal 600 via the port. In this case, the interface 780 may exchange data with the mobile terminal 600.

The interface 780 may serve as a passage for providing electric energy to the connected mobile terminal 600. When the mobile terminal 600 is electrically connected to the interface 780, the interface 780 may provide electric energy supplied from the power supply unit 790 to the mobile terminal 600 under control of the controller 770.

The controller 770 may control the overall operation of each unit inside the vehicle. The controller 770 may be referred to as an Electronic Control Unit (ECU).

The controller 770 may perform a function corresponding to the delivered signal according to delivery of a signal for executing the driver assistance apparatus 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The controller 770 may perform the role of the above-described processor 170. That is, the processor 170 of the driver assistance apparatus 100 may be directly set in the controller 770 of the vehicle. In such an embodiment, the driver assistance apparatus 100 may be understood as a combination of some components of the vehicle.

Alternatively, the controller 770 may control the components to transmit information requested by the processor 170.

The power supply unit 790 may supply power required to operate the respective components under the control of the controller 770. In particular, the power supply unit 790 may receive power from, for example, a battery (not illustrated) inside the vehicle.

The AVN device 400 may exchange data with the controller 770. The controller 770 may receive navigation information from the AVN apparatus or a separate navigation apparatus. Here, the navigation information may include destination information, information on a route to the destination, map information related to vehicle traveling and current position information of the vehicle.

The above described features, configurations, effects, and the like are included in at least one of the embodiments of the present invention, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as including in the scope and spirit of the invention as disclosed in the accompanying claims.

Further, although the embodiments have been mainly described until now, they are just exemplary and do not limit the present invention. Thus, those skilled in the art to which the present invention pertains will know that various modifications and applications which have not been exemplified may be carried out within a range which does not deviate from the essential characteristics of the embodiments. For instance, the constituent elements described in detail in the exemplary embodiments can be modified to be carried out. Further, the differences related to such modifications and applications shall be construed to be included in the scope of the present invention specified in the attached claims.

The invention claimed is:

1. A vehicle driver assistance apparatus in a vehicle, the apparatus comprising:
   a display;
   a camera configured to captures images of surroundings of the vehicle;
   a vehicle information acquisition unit configured to acquire vehicle information of another vehicle which is driving or standing in a vicinity thereof, wherein the vehicle information includes a vehicle identification number of the other vehicle captured by the camera;
   a wireless communication unit configured to wirelessly communicate with the other vehicle; and
   a processor configured to:
   display a service selection screen in a graphical user interface on the display corresponding to at least one service related to the acquired vehicle information, the at least one service being authorized by the other vehicle to be accessed by the vehicle, and
   execute the at least one service in response to a selection of the service selection screen on the display,
   wherein when vehicle information on a plurality of vehicles is acquired through the vehicle information acquisition unit, the processor is further configured to:
   display a vehicle selection screen in the graphical user interface for selecting at least one image of the plurality of vehicles on the display,
   wherein the vehicle selection screen includes a plurality of vehicle information display regions, each display region displaying vehicle information on a corresponding vehicle of the plurality of vehicles,
   wherein each of the plurality of vehicle information display regions includes information indicating whether a specific related service provided by the corresponding vehicle is usable or not, and
   wherein whether the specific related service is usable or not is determined depending on a position of a driver of the vehicle with respect to a distance to the corresponding vehicle of the plurality of vehicles.

2. The vehicle driver assistance apparatus of claim 1, wherein the at least one service includes plurality of services related to the acquired vehicle information.

3. The vehicle driver assistance apparatus of claim 2, wherein the processor is further configured to distinguishably display a service to which access is permitted from a service to which access is restricted on the service selection screen.

4. The vehicle driver assistance apparatus of claim 2, wherein the service selection screen includes a selection menu for selecting the at least one service from among a service list including a call connection service, a text messaging service, a parking movement service, a black box request service, an accident information notification service, and a public information request service.

5. The vehicle driver assistance apparatus of claim 4, wherein the processor is further configured to perform the call connection via the wireless communication unit with a communication device associated with the acquired vehicle information when the call connection service is selected from the service selection screen.

6. The vehicle driver assistance apparatus of claim 4, wherein the call connection service on the service selection screen is selectively activated depending on whether an owner of the other vehicle is located within a predetermined distance.

7. The vehicle driver assistance apparatus of claim 3, wherein, when a service to which access is restricted is selected on the service selection screen, the processor is further configured to transmit, via the wireless communication unit, a request signal to the other vehicle for requesting access to the service to which access is restricted.

8. The vehicle driver assistance apparatus of claim 1, wherein the vehicle information acquisition unit includes an input unit for inputting a vehicle identification number on a vehicle number input screen displayed on the display.

9. The vehicle driver assistance apparatus of claim 1, wherein when the vehicle identification number is acquired, the processor is further configured to:
determine whether the acquired vehicle identification number is a number of a normal vehicle, and
transmit information on the acquired vehicle identification number to an external terminal reporting the vehicle identification number is a number of an illegal vehicle when the determined number is not the number of the normal vehicle.

10. The vehicle driver assistance apparatus of claim 1, wherein each vehicle identification number is associated with multiple preset information.

11. A method of controlling a vehicle driver assistance apparatus in a vehicle, the method comprising:
capturing, via a camera of the vehicle driver assistance apparatus, images of surroundings of the vehicle;
acquiring, via a vehicle information acquisition unit of the vehicle driver assistance apparatus, vehicle information of another vehicle which is driving or standing in a vicinity thereof, wherein the vehicle information includes a vehicle identification number of the other vehicle captured by the camera;
displaying, via a display of the vehicle driver assistance apparatus, a service selection screen in a graphical user interface corresponding to at least one service related to the acquired vehicle information, the at least one service being authorized by the other vehicle to be accessed by the vehicle; and
executing, via a processor of the vehicle driver assistance apparatus, the at least one service in response to a selection of the service selection screen on the display of the vehicle driver assistance apparatus,
wherein when vehicle information on a plurality of vehicles is acquired through the vehicle information acquisition unit, the method further comprising:
displaying, via the display of the vehicle driver assistance apparatus, a vehicle selection screen in the graphical user interface for selecting at least one image of the plurality of vehicles,
wherein the vehicle selection screen includes a plurality of vehicle information display regions, each display region displaying vehicle information on a corresponding vehicle of the plurality of vehicles,
wherein each of the plurality of vehicle information display regions includes information indicating whether a specific related service provided by the corresponding vehicle is usable or not, and
wherein whether the specific related service is usable or not is determined depending on a position of a driver of the vehicle with respect to a distance to the corresponding vehicle of the plurality of vehicles.

12. The method of claim 11, wherein the at least one service includes plurality of services related to the acquired vehicle information.

13. The method of claim 12, further comprising:
distinguishably displaying a service to which access is permitted from a service to which access is restricted on the service selection screen.

14. The method of claim 12, wherein the service selection screen includes a selection menu for selecting the at least one service from among a service list including a call connection service, a text messaging service, a parking movement service, a black box request service, an accident information notification service, and a public information request service.

15. The method of claim 14, further comprising:
performing the call connection, via a wireless communication unit of the vehicle driver assistance apparatus, with a communication device associated with the acquired vehicle information when the call connection service is selected from the service selection screen.

* * * * *